United States Patent
Yamahara et al.

(10) Patent No.: US 6,233,032 B1
(45) Date of Patent: *May 15, 2001

(54) LIQUID CRYSTAL DISPLAY APPARATUS HAVING IMPROVED VIEWING CHARACTERISTICS

(75) Inventors: Motohiro Yamahara, Osaka; Iichiro Inoue, Tenri; Shigeaki Mizushima, Ikoma, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/810,629

(22) Filed: Feb. 28, 1997

(30) Foreign Application Priority Data

Mar. 1, 1996 (JP) .................................................... 8-045229
Mar. 21, 1996 (JP) .................................................... 8-065014

(51) Int. Cl.⁷ ............................ G02F 1/1337; G02F 1/13; G02F 1/1335
(52) U.S. Cl. ............................. 349/129; 349/180; 349/99
(58) Field of Search ...................................... 349/129, 181, 349/124, 99, 180

(56) References Cited

U.S. PATENT DOCUMENTS 5,099,345 * 3/1992 Kozaki et al. ........................ 349/181
5,280,375 * 1/1994 Tsuda et al. ......................... 349/124
5,473,455 * 12/1995 Koike et al. ......................... 349/124
5,576,863 * 11/1996 Aoki et al. .......................... 349/124
5,737,047 * 4/1998 Sakamoto et al. .................... 349/119
5,796,378 * 8/1998 Yoshida et al. ....................... 349/78

FOREIGN PATENT DOCUMENTS

| 57-186735 | 11/1982 | (JP) . |
| 6-235919 | 9/1995 | (JP) . |
| 7 234 400 | 9/1995 | (JP) . |
| 7-248497 | 9/1995 | (JP) . |
| 843 825 | 2/1996 | (JP) . |
| 8-95054 | 4/1996 | (JP) . |

* cited by examiner

Primary Examiner—Toan Ton
(74) Attorney, Agent, or Firm—Dike, Bronstein, Roberts & Cushman, IP Group; David G. Conliu; William J. Daley

(57) ABSTRACT

A liquid crystal display apparatus of the present invention, which has a plurality of display pixels arranged in a matrix, includes: a pair of substrates opposing each other; a liquid crystal layer placed between the pair of substrates; an alignment film formed on a surface of at least one of the pair of substrates opposing the liquid crystal layer and subjected to a treatment for aligning liquid crystal molecules in the liquid crystal layer; and a pair of polarizing plates placed so as to interpose the pair of substrates, wherein the liquid crystal layer is divided into at least two regions in each of the display pixels, alignment states of the liquid crystal molecules are different in the at least two regions, and one absorption axis of one of the pair of polarizing plates is substantially parallel to a 6–12 o'clock direction or a 3–9 o'clock direction.

7 Claims, 20 Drawing Sheets

LIQUID CRYSTAL DISPLAY APPARATUS HAVING IMPROVED VIEWING CHARACTERISTICS

BACKGROUND OF THE INVENTION

1. Field of the Invention

The present invention relates to a liquid crystal display apparatus. More specifically, the present invention relates to a liquid crystal display apparatus having improved viewing angle characteristics.

2. Description of the Related Art

Conventionally, liquid crystal display apparatuses using nematic liquid crystal display devices have been widely used as numerical value segment type liquid crystal display apparatuses such as clocks and calculators. In recent years, such apparatuses have been used for displays of word processors, computers, and navigation systems, and TVs.

In the above-mentioned liquid crystal display apparatus, an active element such as a thin film transistor (hereinafter, referred to as a "TFT") is generally formed for selectively driving a pixel electrode which applies a voltage to a liquid crystal layer. Furthermore, a color filter layer of red, green, blue, etc. is provided for the purpose of conducting a color display. As a display system, the following two liquid crystal display systems have been used, depending upon the twist angle of nematic liquid crystal to be used:

(a) An active drive type twisted nematic (TN) liquid crystal display system in which nematic liquid crystal molecules are aligned so as to be twisted by 90°.

(b) A multiplex drive type super twisted nematic (STN) liquid crystal display system in which nematic liquid crystal molecules are aligned so as to be twisted by more than 90°.

The liquid crystal display devices driven by the above-mentioned two systems have problems such as viewing angle dependence and a small viewing angle. Therefore, various methods for solving these problems have been suggested.

For example, it is suggested in Japanese Laid-Open Patent Publication No. 57-186735 that each pixel be divided into two regions and the viewing angle characteristics of these regions made different, whereby each pixel is provided with a plurality of viewing angle characteristics. Furthermore, it is suggested in Japanese Laid-Open Patent Publication No. 7-248497 that liquid crystal molecules be aligned so as to be twisted by a plurality of twist angles in each pixel.

According to the method disclosed in Japanese Laid-Open Patent Publication No. 57-186735, each pixel has two viewing angle directions: a 12 o'clock direction and a 6 o'clock direction. In a liquid crystal panel having such viewing angle characteristics, viewing angle dependence exists in the vertical direction (i.e., 6–12 o'clock direction) and horizontal direction (i.e., 3–9 o'clock direction). In particular, the viewing angle dependence in the case where the display panel is seen in the horizontal direction (i.e., 3–9 o'clock direction) is almost the same as that in a TN liquid crystal panel to which a conventional alignment division method is not applied. More specifically, the problem of the viewing angle dependence is not solved even by applying the alignment division method. When a viewing angle is increased from the vertical direction (viewing angle of 0°) to the horizontal direction to the display panel, black end white (contrast) of an image is inverted in the vicinity of a viewing angle of 30° (gray-scale inversion phenomenon).

In the present specification, a "viewing angle" refers to an angle formed by a normal line to a display surface of a liquid crystal display device (liquid crystal panel) and a viewing angle direction (i.e., a direction in which a user sees the display surface: a line of sight). An "azimuth angle" refers to an angle formed by a component of a display surface in a viewing angle direction and a reference direction of the display surface. The reference direction is typically set in an upper direction (i.e., a 12 o'clock direction, for example, in the face of a clock) in the case where a user sees the display surface.

The wording "viewing angle characteristics" of a liquid crystal display apparatus refers to the dependence on the direction of a line of sight of a user in a wide sense. Specifically, it refers to the dependence of display characteristics on the above-mentioned "viewing angle" and "azimuth angle".

When the viewing angle is increased from 0° in the vertical direction, averaged characteristics of the viewing angle characteristics in the 6 o'clock direction and in the 12 o'clock direction in the conventional TN liquid crystal panel can be obtained. Thus, the viewing angle characteristics obtained by increasing the viewing angle in the 12 o'clock direction become symmetric with respect to those obtained by increasing the viewing angle in the 6 o'clock direction. However, there is a limit to the extent contrast can be increased when the viewing angle is tilted down.

According to the methods described in the abovementioned publications, there is a limit to improvement of the viewing angle characteristics in the azimuth angle of 45° from an absorption axis or a transmission axis of a polarizing plate.

SUMMARY OF THE INVENTION

The liquid crystal display apparatus of the present invention, having a plurality of display pixels arranged in a matrix, includes: a pair of substrates opposing each other; a liquid crystal layer placed between the pair of substrates; an alignment film formed on a surface of at least one of the pair of substrates opposing the liquid crystal layer and subjected to a treatment for aligning liquid crystal molecules in the liquid crystal layer; and a pair of polarizing plates placed so as to interpose the pair of substrates, wherein the liquid crystal layer is divided into at least two regions in each of the display pixels, alignment states of the liquid crystal molecules are different in the at least two regions, and one absorption axis of one of the pair of polarizing plates is substantially parallel to a 6–12 o'clock direction or a 3–9 o'clock direction.

Alternatively, the liquid crystal display apparatus of the present invention, having a plurality of display pixels arranged in a matrix, includes: a pair of substrates opposing each other; a liquid crystal layer placed between the pair of substrates; an alignment film formed on a surface of at least one of the pair of substrates opposing the liquid crystal layer and subjected to a treatment for aligning liquid crystal molecules in the liquid crystal layer; and a pair of polarizing plates placed so as to interpose the pair of substrates, wherein the liquid crystal layer is divided into first and second liquid crystal regions in each of the display pixels, the first and second liquid crystal regions have a different viewing angle dependence, a relationship $\psi 1+\psi 2=180°$ is satisfied, where $\psi 1$ is a first twist angle of the liquid crystal molecules in the first liquid crystal region and $\psi 2$ is a second twist angle of the liquid crystal molecules in the second liquid crystal region, one absorption axis of the pair of polarizing plates is placed in a direction so as to substantially bisect the first twist angle, and the other absorption axis of the pair of polarizing plates is placed in a direction so as to substantially bisect the second twist angle.

In one embodiment of the present invention, the one absorption axis of one of the pair of polarizing plates is substantially parallel to the 6–12 o'clock direction, and the other absorption axis is substantially parallel to the 3–9 o'clock direction.

In another embodiment of the present invention, an angle formed by the one absorption axis of the pair of polarizing plates and the other absorption axis is in a range of 90°±5°.

In another embodiment of the present invention, retardation of the liquid crystal layer is in a range of 340 nm to 440 nm.

In another embodiment of the present invention, the liquid crystal molecules in the liquid crystal layer are aligned so as to be twisted by 90°.

Hereinafter, the function of the present invention will be described.

According to the present invention, a viewing angle can be increased both in the vertical direction and in the horizontal direction. Regarding the effect of the increase in viewing angle, the increase in viewing angle in the horizontal direction and the improvement in grayscale inversion are indispensable, considering the shape of a screen which is becoming wider and the condition under which people watch a screen.

In a liquid crystal display apparatus in which liquid crystal alignment is divided into at least two regions in each pixel, the contrast ratio in the horizontal direction changes less than in the vertical direction irrespective of the characteristics of the polarizing plates, and a wide viewing angle with outstanding visibility can be realized by setting an absorption axis of either of upper and lower polarizing plates so as to be almost parallel to the 6–12 o'clock direction (vertical direction) or the 3–9 o'clock direction (horizontal direction) and setting an angle formed by the absorption axis of the polarizing plate and the absorption axis of the other polarizing plate so as to be 90°±5°. In the present specification, the phrase "liquid crystal alignment is divided" refers to a liquid crystal layer being divided into a plurality of regions so as to provide regions with different alignment states in liquid crystal molecules.

In a liquid crystal display apparatus in which liquid crystal alignment is divided into at least two regions (first and second liquid crystal regions) in each pixel, the absorption axis of one polarizing plate is placed so as to substantially bisect ψ1 and the absorption axis of the other polarizing plate is placed so as to substantially bisect ψ2, whereby the viewing angle dependence in the horizontal direction as well as in the vertical direction can be improved. Herein, ψ1 and ψ2 are angles (twist angles of liquid crystal molecules in the first and second liquid crystal regions) formed by alignment directions of the liquid crystal molecules on upper and lower substrates in the respective regions. Furthermore, in the case where the angle formed by the absorption axis of one polarizing plate and the absorption axis of the other polarizing plate is 90±5°, a gray-scale inversion in the horizontal direction is eliminated irrespective of the characteristics of the polarizing plates, and the viewing angle can also be increased in the vertical direction. In addition, the changes in contrast ratio in the vertical direction and in the horizontal direction can be made the same.

Furthermore, by setting the retardation of the liquid crystal layer in the range of 340 nm to 440 nm, high-quality display characteristics with an isotropically large viewing angle, a satisfactory color balance of transmitted light, and outstanding visibility can be obtained without coloring.

The display mode of the present example is an ECB (Electrically Controlled Birefringence) mode in which liquid crystal molecules are twisted by 90° or more. In this mode, the optical rotary characteristics remain, compared with modes without any twists. Therefore, the light utilization efficiency increases, and the light transmittance under no application of a voltage is high. Furthermore, the liquid crystal molecules rise under the application of a voltage, whereby a satisfactory black display is made possible in a direction without any phase difference. Thus, a sufficient display quality can be obtained.

In a TN mode, an inversion phenomenon occurs when the viewing angle is tilted from the normal line to a display screen (see FIG. 9). However, in the ECB mode, even when the viewing angle is tilted, a display quality is enhanced without any inversion phenomenon.

Thus, the invention described herein makes possible the advantage of providing a liquid crystal display apparatus which is capable of overcoming an inversion phenomenon by changing the direction of a polarizing plate, thereby realizing wide viewing angle characteristics with a high image quality.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention Will be described by way of illustrative examples with reference to the drawings. It should be noted that the present invention is not limited to the following examples.

EXAMPLE 1

Figure 2:
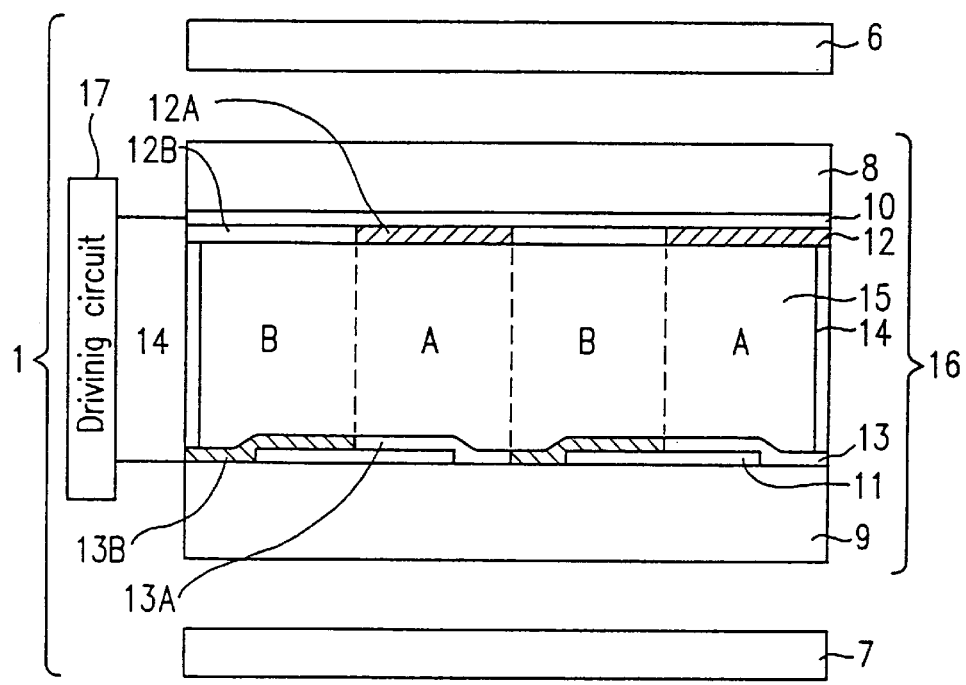
FIG. 2 is a cross-sectional view of a liquid crystal display apparatus in Example 1 according to the present invention.

FIG. 2 is a cross-sectional view showing a structure of a liquid crystal display apparatus 1 of Example 1. The liquid crystal display apparatus 1 includes a simple matrix type liquid crystal display device 16 and a pair of polarizing plates 6 and 7. In the liquid crystal display device 16, substrates are provided on both sides thereof so as to interpose a liquid crystal layer 15. One substrate (placed on the upper side of FIG. 2) is provided with a strip-shaped transparent electrode 10 made of ITO (indium tin oxide) on a surface of a bass glass substrate 8 on the liquid crystal layer 15 side, and an alignment film 12 is formed on the transparent electrode 10. The other substrate (placed on the lower side of FIG. 2) is provided with a strip-shaped transparent electrode 11 made of ITO on a surface of a base glass substrate 9 on the liquid crystal layer 15 side, and an alignment film 13 is formed on the transparent electrode 11. The transparent electrodes 10 and 11 respectively have a predetermined width and are formed at a predetermined interval in such a manner as to be orthogonal to each other when seen in the direction of a normal line to the glass substrates 8 and 9. Overlapping portions of the transparent electrodes 10 and 11 form pixels contributing to a display. The pixels are provided in a matrix. As shown in FIG. 2, the liquid crystal layer 15 is sealed with a sealing resin, and the liquid crystal display device 16 is provided with a driving circuit 17.

The electrode wiring pattern on each substrate is not limited to the above-mentioned structure. For example, a switching element such as a TFT and a transparent pixel electrode may be provided on one substrate so as to be in a matrix state with respect to signal lines and gate lines, and a common transparent electrode may be provided on the other substrate (active matrix type liquid crystal display device). In this case, portions interposed between each pixel electrode and the corresponding common electrode become respective pixels.

Figure 1:
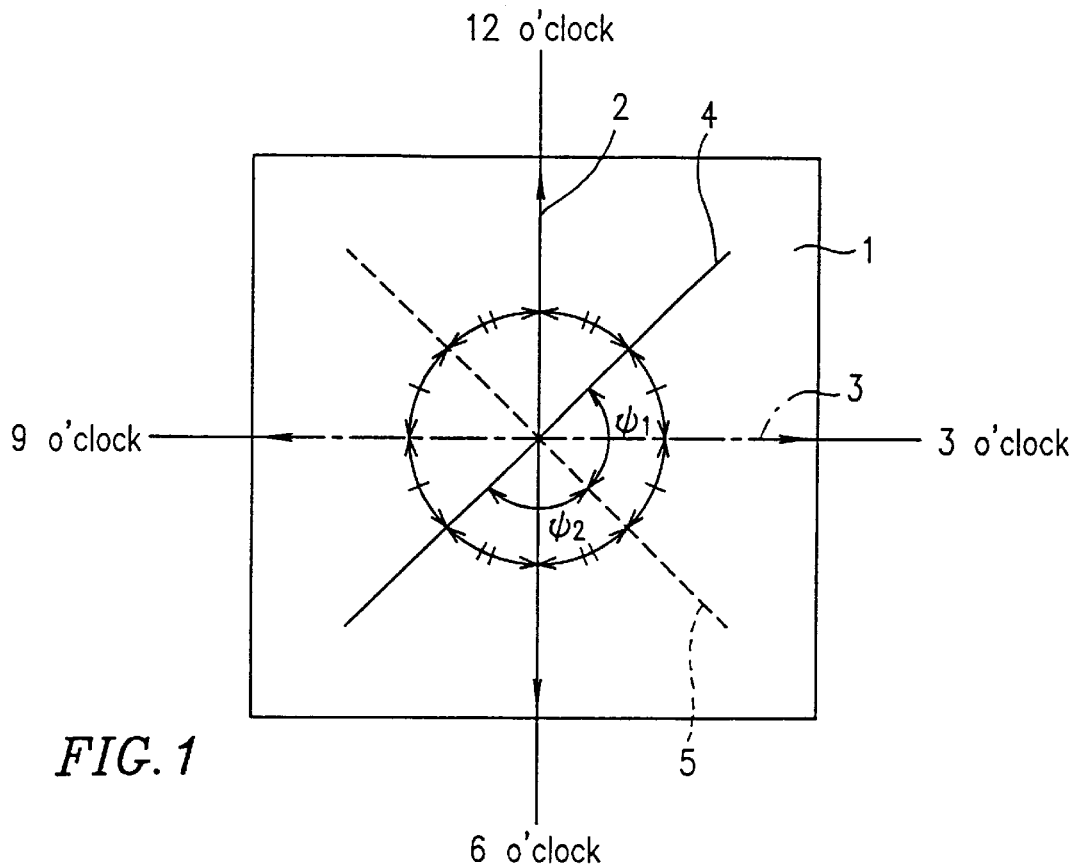
FIG. 1 is a plan view showing the setting direction of a polarizing plate in Example 1 according to the present invention.

The alignment films 12 and 13 are subjected to an alignment treatment in such a manner that liquid crystal molecules in contact with the alignment films 12 and 13 are aligned in alignment directions 4 and 5 as shown in FIG. 1, respectively. The alignment film 12 has regions 12A and 12B which are different in state, and the alignment film 13 has regions 13A and 13B which are different in state. This allows regions A and B of the liquid crystal layer 15 to be controlled in such a manner that liquid crystal molecules in these regions are aligned differently. More specifically, for example, the regions A and B are controlled so that the pretilt angles of the liquid crystal molecules in these regions are different from each other; alternatively, the regions A and B are controlled so that the pretilt angles of the liquid crystal molecules in these regions are opposite to each other. Accordingly, in the liquid crystal display device 16 in FIG. 2, the liquid crystal layer 15 is subjected to an alignment division into two regions A and B. It is noted that any suitable type of processing may be used for making the alignment state of liquid crystal molecules different from region to region.

In the present example, a liquid crystal material with a chiral dopant added thereto having an isotropy of refractive index Δn of 0.089 is used for the liquid crystal layer 15, and the thickness of the liquid crystal layer 15 is set to be about 4.5 μm. The twist angle in the alignment direction of the liquid crystal molecules between the substrates 8 and 9 is set to be $\psi 1 = \psi 2 = 90°$, where $\psi 1$ and $\psi 2$ are twist angles in the regions A and B of the liquid crystal layer 15.

FIG. 1 shows the direction in which the polarizing plates of the liquid crystal display apparatus 1 of Example 1 are placed. In the liquid crystal display apparatus 1, the polarizing plate 6 is placed in such a manner that an absorption axis 2 forms an angle $\psi 2/2$ with respect to the alignment direction 4 of the liquid crystal molecules on the glass substrate 8 side, and the polarizing plate 7 is placed in such a manner that an absorption axis 3 forms an angle $\psi 1/2$ with respect to the alignment direction 5 of the liquid crystal molecules on the glass substrate 9 side. The directions of the absorption axes 2 and 3 of the polarizing plates 6 and 7 may be rotated by 90°. In the present example, since $\psi 1 = 90°$ and $\psi 2 = 90°$, the polarizing plate 6 is placed in such a manner that the absorption axis 2 forms an angle of 45° with respect to the alignment direction 4 of the liquid crystal molecules in contact with the glass substrate 8 (i.e., liquid crystal molecules with the alignment direction thereof defined by the alignment film 12 formed on the glass substrate 8), and the polarizing plate 7 is placed in such a manner that the absorption axis 3 forms an angle of 45° with respect to the alignment direction 5 of the liquid crystal molecules in contact with the glass substrate 9 (i.e., liquid crystal molecules with the alignment direction thereof defined by the alignment film 13 formed on the glass substrate 9).

Next, the measurement result of the viewing angle dependence of the liquid crystal display apparatus 1 thus obtained will be described.

Figure 3:
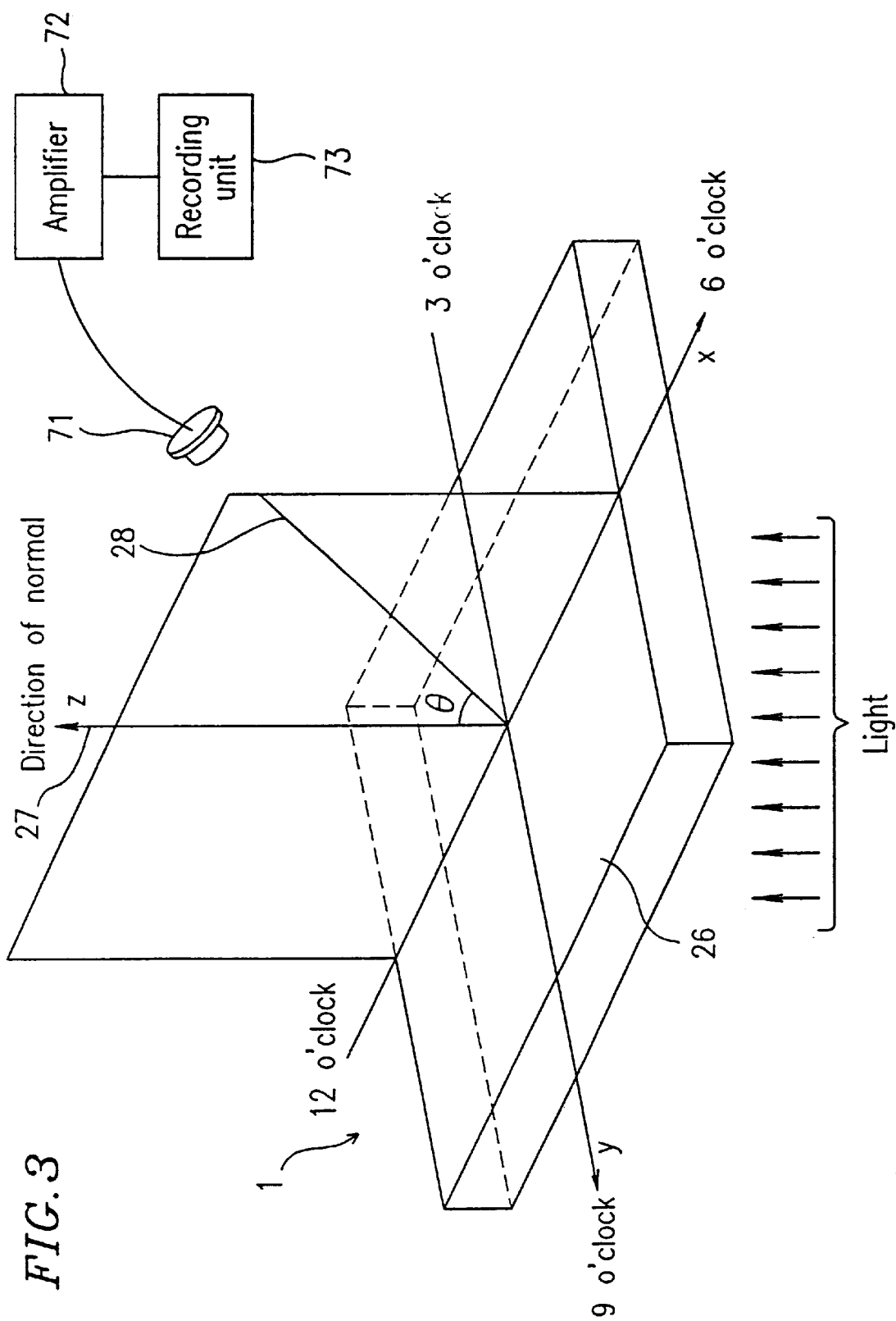
FIG. 3 is a schematic perspective view showing a measurement system of a viewing angle dependence of a liquid crystal display apparatus.

FIG. 3 is a schematic perspective view of a measurement system for the viewing angle dependence of the liquid crystal display apparatus 1. A plane 26 on which the glass substrate 8 is in contact with the polarizing plate 6 is placed on a reference plane x-y of rectangular coordinates xyz, and a light-receiving element 71 having a predetermined light-receiving solid angle is placed at a position with a predetermined distance from the origin of the rectangular coordinates xyz at various azimuth angles (e.g., direction 28 in the figure: 6 o'clock direction) and various viewing angles θ. Under this condition, monochromatic light having a wavelength of 550 nm is allowed to be incident through the polarizing plate 7. The output of the light-receiving element 71 is amplified to a predetermined level by an amplifier 72, and the amplified output is recorded in a recording unit 73 such as a waveform memory and a recorder.

Figure 4:
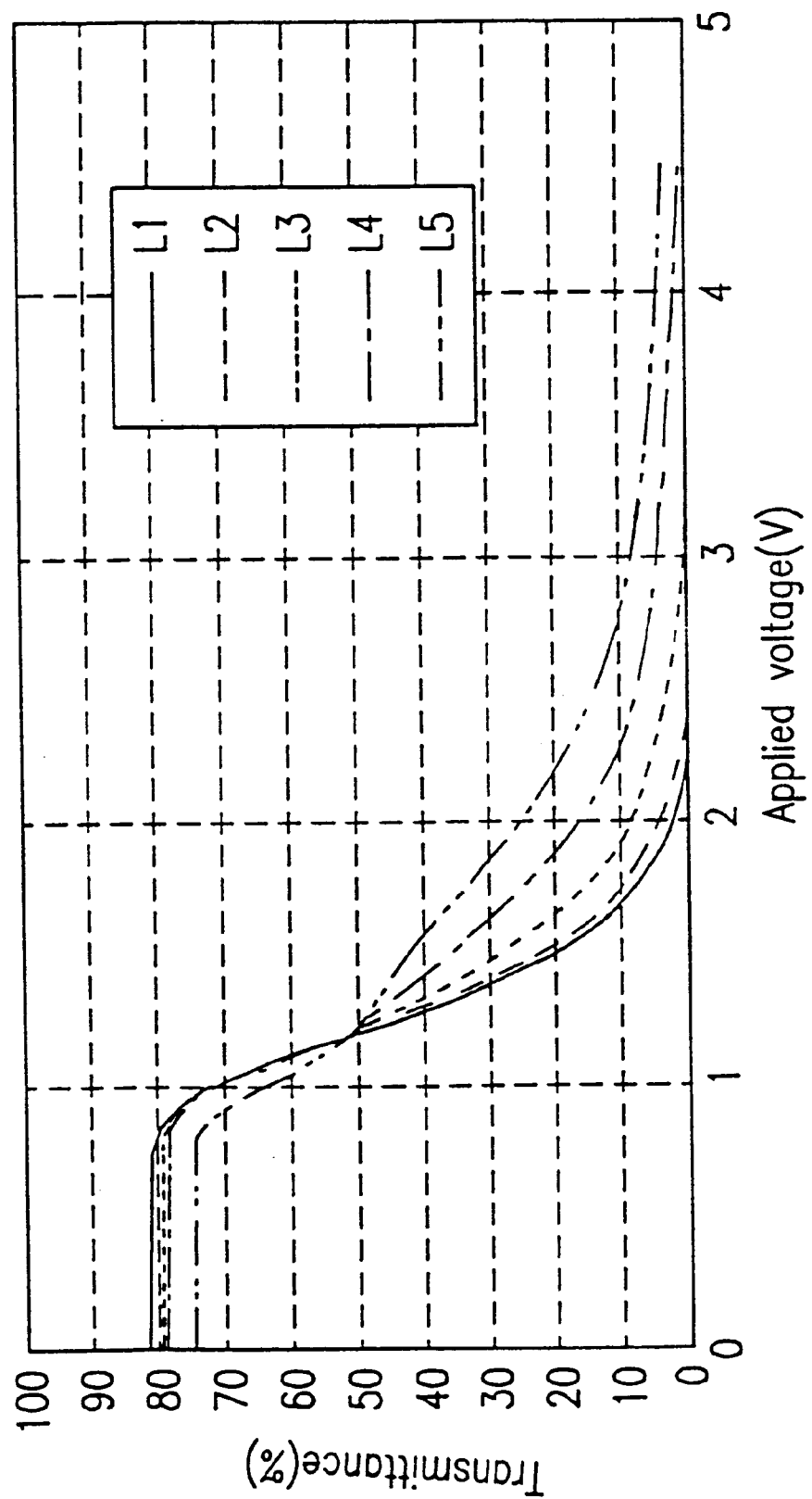
FIG. 4 is a graph showing a transmittance applied voltage characteristic in a 6 o'clock direction of the liquid crystal display apparatus in Example 1 according to the present invention.
Figure 5:
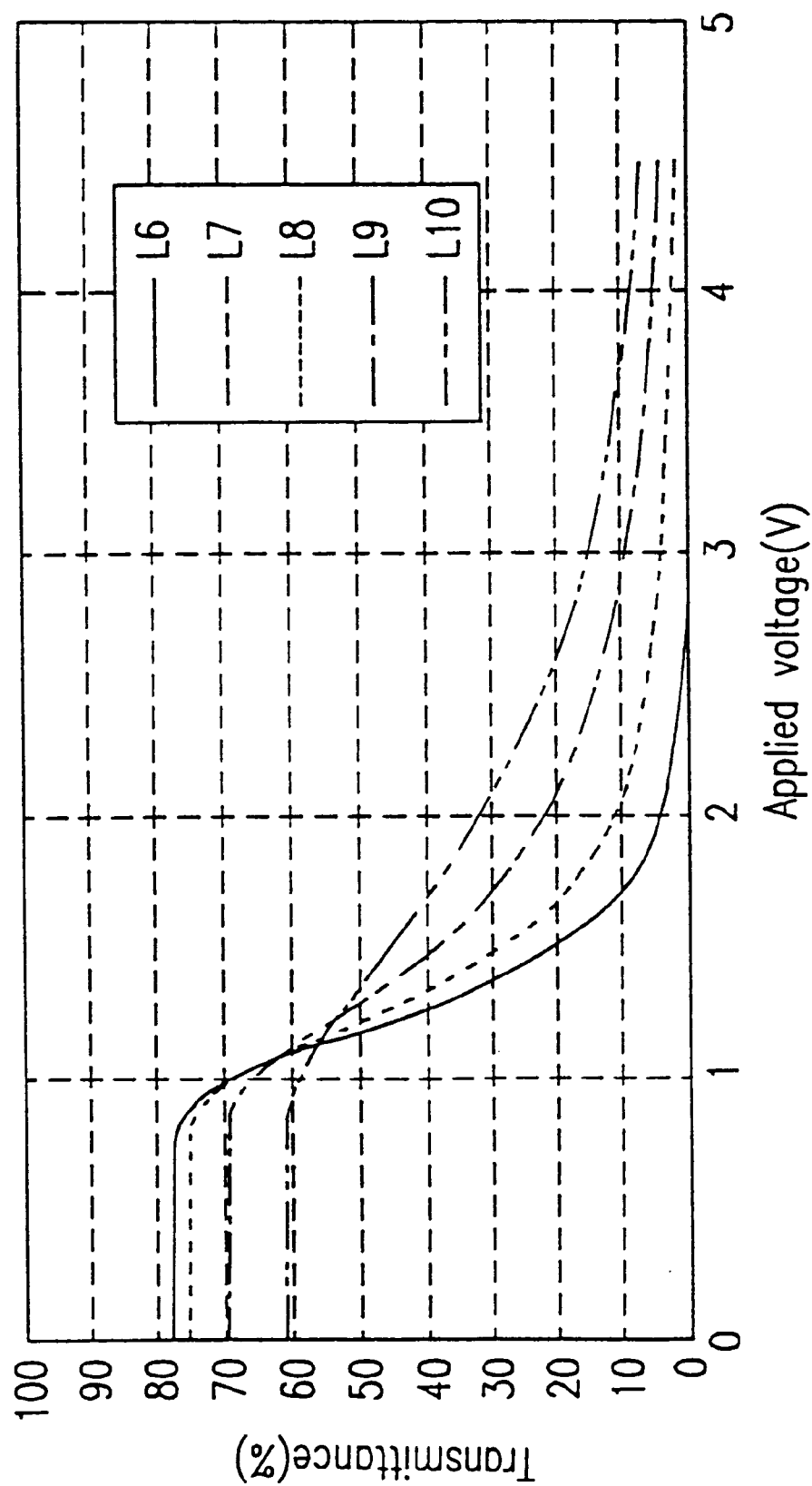
FIG. 5 is a graph showing a transmittance applied voltage characteristic in a 3 o'clock direction of the liquid crystal display apparatus in Example 1 according to the present invention.

The liquid crystal display apparatus 1 in which the polarizing plates 6 and 7 are placed so that the absorption axes 2 and 3 thereof are orthogonal to each other was placed in the measurement system shown in FIG. 3, whereby the viewing angle dependence of the liquid crystal display apparatus 1 was measured. The result of the measurement is shown as graphs of transmittance-applied voltage characteristics in FIGS. 4 and 5. FIG. 4 shows the result in the 6 o'clock direction. In FIG. 4, lines L1, L2, L3, L4 and L5 represent the cases of θ=0°, θ=10°, θ=20°, θ=30°, and θ=40°, respectively. As is understood from this result, even when the applied voltage is gradually increased from 0 volt to 4 volts at which a display is typically conducted (i.e., at which a black state is displayed in a TN-type LCD in a normally white (NW) mode), the transmittance measured at the position of θ=40° is 5% or less. In this manner, it is understood that the viewing angle is increased by setting the relationship between the alignment direction of the liquid crystal molecules in the liquid crystal layer 15 and the absorption axis of each polarizing plate as in the present example. The same result was also obtained even in the 12 o'clock direction. FIG. 5 shows the result in the 3 o'clock direction. In FIG. 5, lines L6, L7, L8, L9, and L10 represent the cases of θ=0°, θ=10°, θ=20°, θ=30°, and θ=40°, respectively. As is understood from this result, even when the applied voltage is gradually increased from 0 volts to 4 volts at which a display is typically conducted (i.e., at which a black state is displayed in a TN-type LCD in a normally white (NW) mode), the transmittance measured at the position of θ=40°, is 10% or less. Thus, it is understood that the viewing angle is increased. The same result was also obtained even in the 9 o'clock direction.

Comparative Example 1

Figure 7:
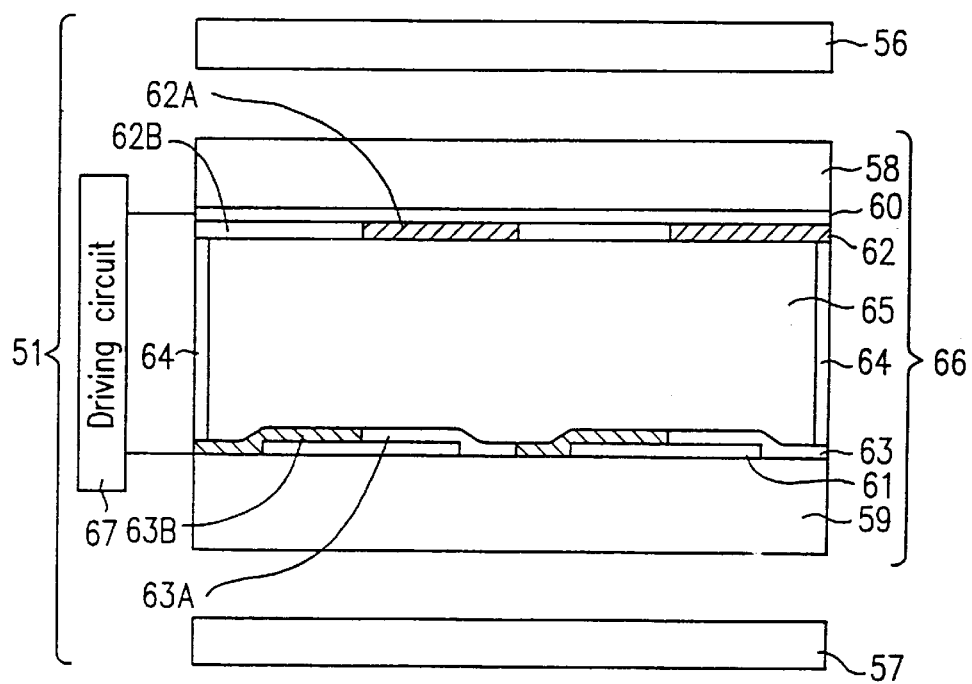
FIG. 7 is a cross-sectional view of a liquid crystal display apparatus in Comparative Example 1.

FIG. 7 is a cross-sectional view showing a structure of a liquid crystal display apparatus 51 of Comparative Example 1. The liquid crystal display apparatus 51 includes a liquid crystal display device 66 and a pair of polarizing plates 56 and 57 provided on either side thereof. In the liquid crystal display device 51, substrates are provided on both sides thereof so as to interpose a liquid crystal layer 65. One substrate (placed on the upper side of FIG. 7) is provided with a transparent electrode 60 made of ITO on a surface of a base glass substrate 58 on the liquid crystal layer 65 side, and an alignment film 62 is formed on the transparent electrode 60. The other substrate (placed on the lower side of FIG. 7) is provided with a transparent electrode 61 made of ITO on a surface of a base glass substrate 59 on the liquid crystal layer 65 side, and an alignment film 63 is formed on the transparent electrode 61. The transparent electrodes 60 and 61 respectively have a predetermined width and are formed at a predetermined interval in such a manner as to be orthogonal to each other when seen in the direction of a normal line to the glass substrates 58 and 59. Overlapping portions of the transparent electrodes 60 and 61 form pixels contributing to a display. The pixels are provided in a matrix. As shown in FIG. 7, the liquid crystal layer 65 is sealed with a sealing resin, and the liquid crystal display device 66 is provided with a driving circuit 67.

The alignment film 62 has regions 62A and 62B which are different in state, and the alignment film 63 has regions 63A and 63D which are different in state. This allows a region of the liquid crystal layer 65 interposed between the region 62A and the region 63A and a region of the liquid crystal layer 65 interposed between the region 62B and the region 63A to be controlled in such a manner that liquid crystal molecules in these regions are aligned differently. More specifically, for example, these regions are controlled so that the pretilt angles of the liquid crystal molecules in these regions are different from each other; alternatively, these regions are controlled so that the pretilt angles of the liquid crystal molecules in these regions are opposite to each other. Accordingly, in the liquid crystal display device 66 in FIG. 7, the liquid crystal layer 65 is subjected to an alignment division into two regions.

In the present comparative example, a liquid crystal material with a chiral dopant added thereto having an isotropy of refractive index Δn of 0.089 (a chiral pitch is adjusted so that a twist angle becomes 90°) is used for the liquid crystal layer 65, and the thickness of the liquid crystal layer 15 is set to be about 4.5 μm.

Figure 6:
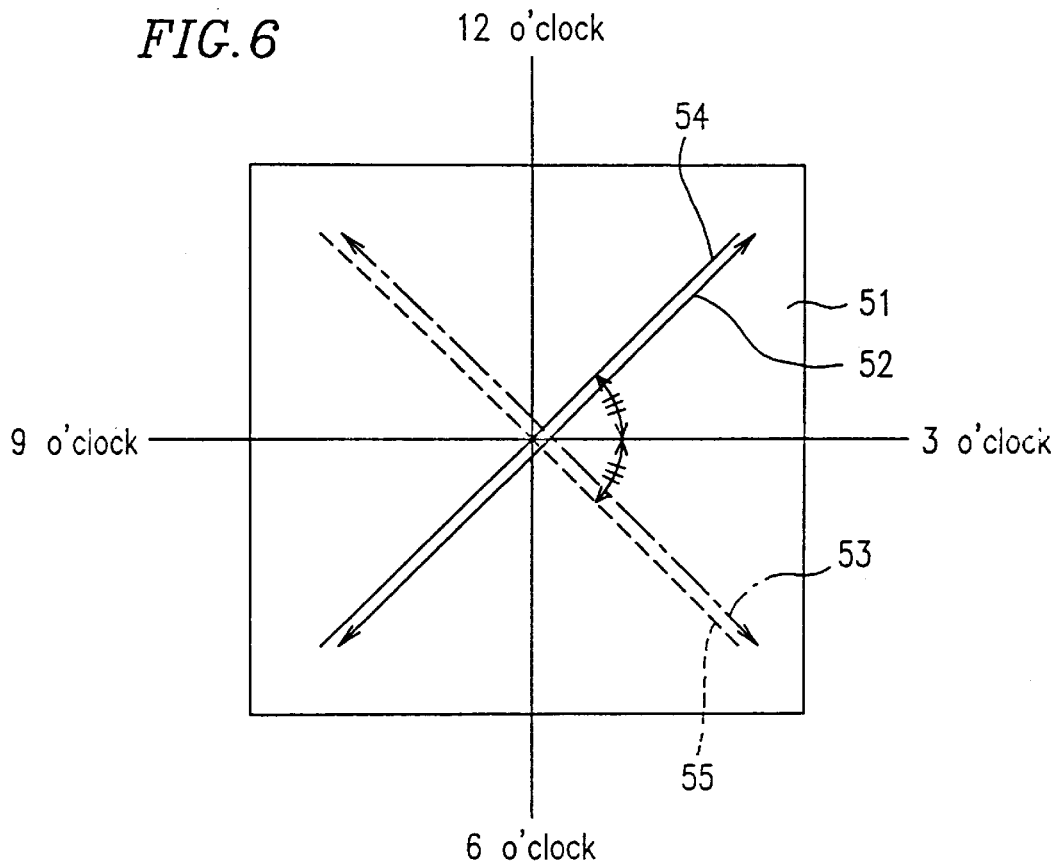
FIG. 6 is a plan view showing the setting direction of a polarizing plate in Comparative Example 1.

FIG. 6 shows the direction in which the polarizing plates of the liquid crystal display apparatus 51 of Comparative Example 1 are placed. In the liquid crystal display apparatus 51, the polarizing plate 56 is placed in such a manner that an absorption axis 52 is almost parallel to an alignment direction 54 of the liquid crystal molecules in contact with the glass substrate 58, and the polarizing plate 57 is placed in such a manner that an absorption axis 53 is almost parallel to an alignment direction 55 of the liquid crystal molecules in contact with the glass substrate 59.

Figure 8:
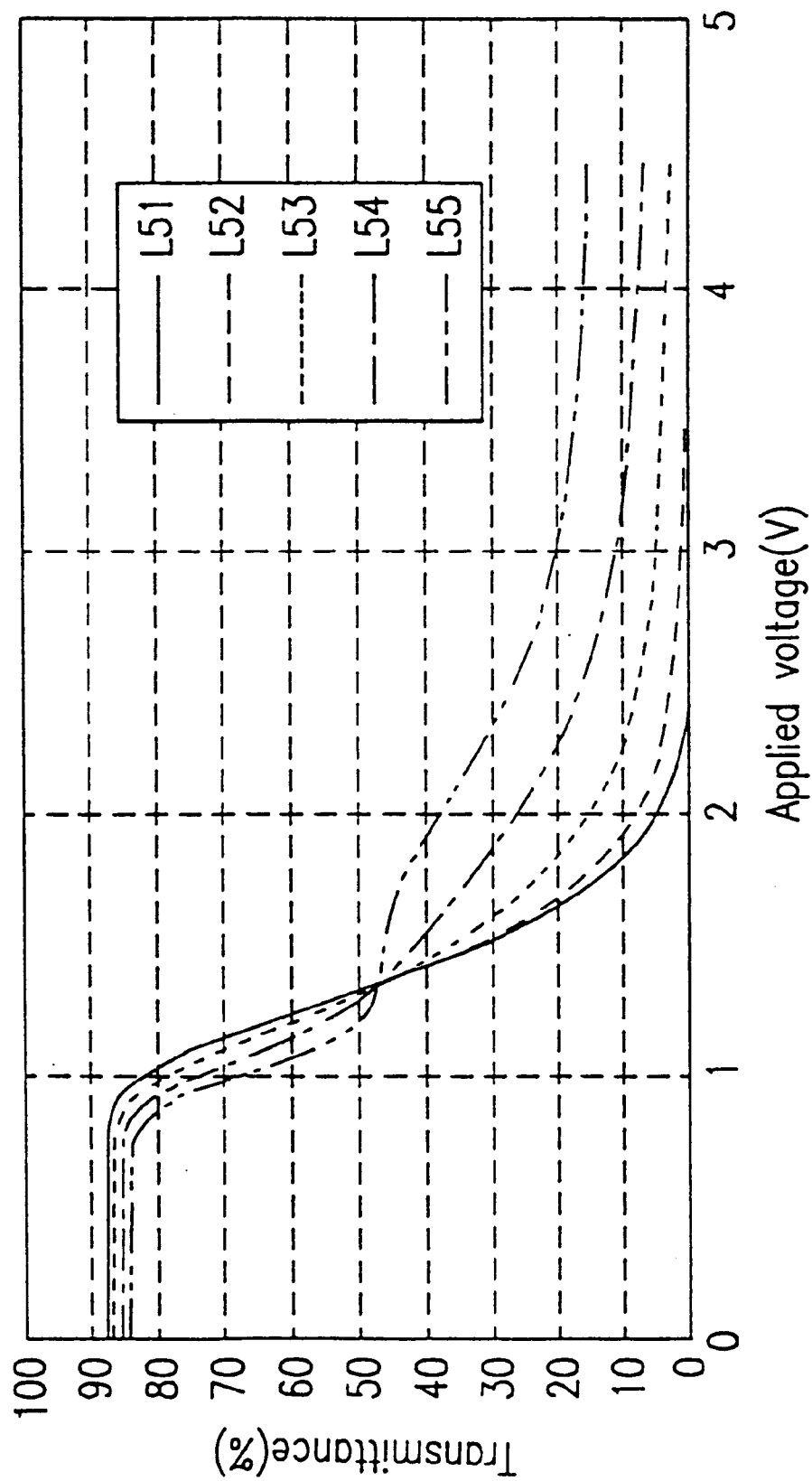
FIG. 8 is a graph showing a transmittance applied voltage characteristic in a 6 o'clock direction of the liquid crystal display apparatus in Comparative Example 1.

The liquid crystal display apparatus 51 was placed in the measurement system shown in FIG. 3 in the same way as in Example 1, whereby the viewing angle dependence of the liquid crystal display apparatus 51 was measured. The result of the measurement is shown as graphs of transmittance-applied voltage charaoteristics in FIGS. 8 and 9. FIG. 8 shows the result in the 6 o'clock direction. In FIG. 8, lines L51, L52, L53, L54 and L55 represent the cases of θ=0°, θ=10°, θ=20°, θ=30°, and θ=40°, respectively. As is understood from FIG. 8, even when the applied voltage is gradually increased to 4 volts at which a display is typically conducted, the transmittance measured at the position of θ=40° is more than 10%. The same result was also obtained even in the 12 o'clock direction.

Figure 9:
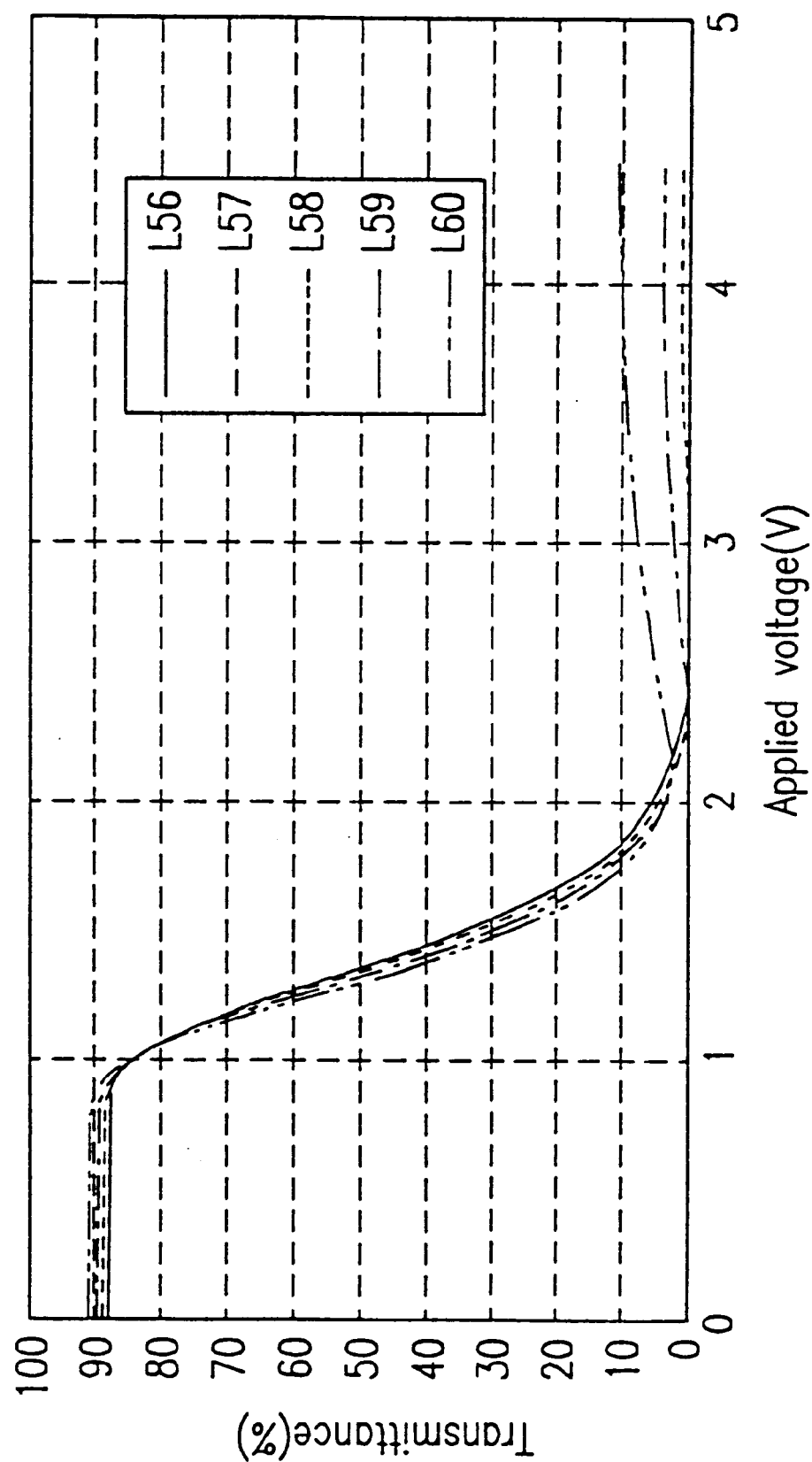
FIG. 9 is a graph showing a transmittance applied voltage characteristic in a 3 o'clock direction of the liquid crystal display apparatus in Comparative Example 1.

FIG. 9 shows the result in the 3 o'clock direction. In FIG. 9, lines L56, L57, L58, L59, and L60 represent the cases of θ=0°, θ=10°, θ=20°, θ=30°, and θ=40°, respectively. As is understood from this result, when the applied voltage is gradually increased from 0 volt, a gray-scale inversion phenomenon occurs at θ=30° and θ=40°. The same result was also obtained even in the 9 o'clock direction.

Thus, compared with Comparative Example 1, the liquid crystal display apparatus of Example 1 has remarkably improved viewing angle dependence, specifically, the viewing angle characteristics in the 3 o'clock and 9 o'clock directions as well as those in the 12 o'clock and 6 o'clock directions are improved. When evaluated at a viewing angle capable of providing a display with a predetermined contrast ratio, the liquid crystal display apparatus of Example 1 has a wider viewing angle than that of Comparative Example 1.

In Example 1, the liquid crystal display apparatus 1 in which the polarizing plates 6 and 7 are placed so that their absorption axes 2 and 3 are almost orthogonal to each other is exemplified. However, the same effect can also be obtained in the case where the absorption axes form an angle of 90°±5°, the twist angles ψ1 and ψ2 in the regions A and B satisfy: ψ1+ψ2=180°, and the polarizing plates 6 and 7 are placed so as to satisfy the above-mentioned relationship.

Furthermore, in Example 1, a simple matrix type liquid crystal display apparatus is described. However, the same result can also be obtained in the case where the polarizing plates are placed as in Example 1 in an active matrix type liquid crystal display apparatus using an active switching element such as a TFT.

EXAMPLE 2

Figure 11:
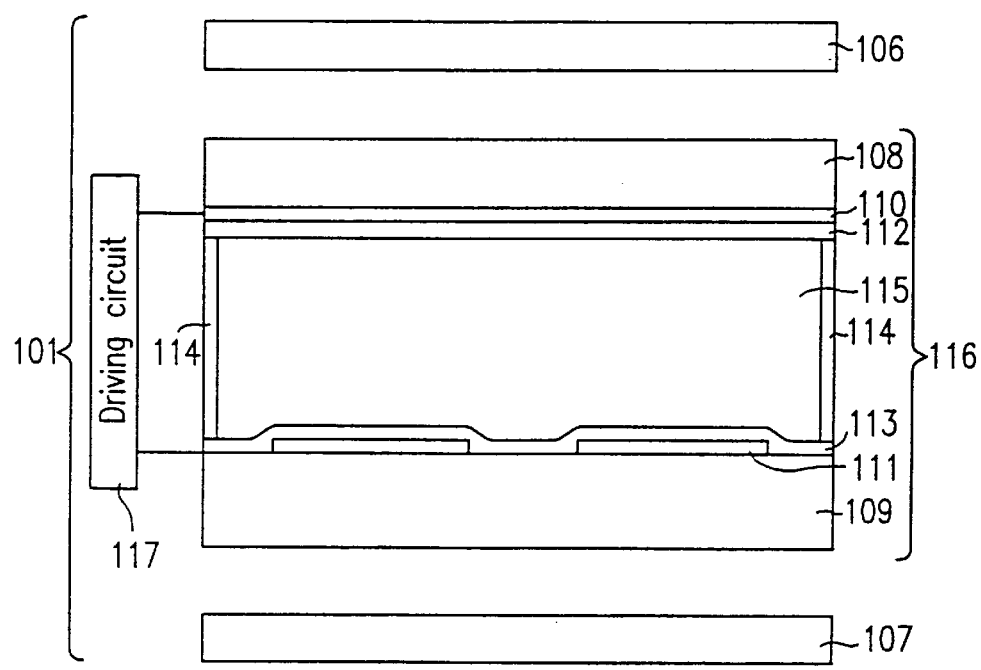
FIG. 11 is a cross-sectional view of a liquid crystal display apparatus in Example 2 according to the present invention.

FIG. 11 is a cross-sectional view showing a structure of a liquid crystal display apparatus 101 of Example 2. The liquid crystal display apparatus 101 includes a liquid crystal display device 116 and a pair of polarizing plates 106 and 107. In the liquid crystal display device 116, substrates are provided on both sides thereof so as to interpose a liquid crystal layer 115. One substrate (placed on the upper side of FIG. 11) is provided with a transparent electrode 110 made of ITO on a surface of a base glass substrate 108 on the liquid crystal layer 115 side, and an alignment film 112 is formed on the transparent electrode 110. The other substrate (placed on the lower side of FIG. 11) is provided with a transparent electrode 111 made of ITO on a surface of a base glass substrate 109 on the liquid crystal layer 115 side, and an alignment film 113 is formed on the transparent electrode 111. The transparent electrodes 110 and 111 respectively have a predetermined width and are formed at a predetermined interval in such a manner as to be orthogonal to each other when seen in the direction of a normal line to the glass substrates 108 and 109, Overlapping portions of the transparent electrodes 110 and 111 form pixels contributing to a display. The pixels are provided in a matrix. As shown in FIG. 11, the liquid crystal layer 115 is sealed with a sealing resin, and the liquid crystal display device 116 is provided with a driving circuit 117.

The alignment films 112 and 113 are subjected to an alignment treatment by UV-irradiation or a special alignment treatment. Because of this, the liquid crystal molecules in contact with the alignment films 112 and 113 are controlled so as to be aligned in different directions in a plurality of regions between the respective alignment films 112 and 113, aligned in a radial shape, or randomly. Alternatively, the liquid crystal molecules can be controlled so as to have a random twist angle. Since the alignment films 112 and 113 are subjected to such treatment, the alignment state of the liquid crystal molecules is different in a plurality of regions of the liquid crystal layer 115 in the liquid crystal display device 116. A specific method for aligning liquid crystal molecules is, for example, disclosed in Japanese Laid-Open Patent Publication No. 8-95054. According to this method, regions having different surface free energy are patterned on the surface of a substrate on a liquid crystal layer side by using a resist material, and an incompatible polymer alloy is coated onto the surface of the patterned regions. The incompatible polymer alloy shows a phase separation structure in a radial shape in accordance with the pattern of the regions. When the alignment film thus obtained is used, liquid crystal molecules are radially aligned in accordance with the phase separation structure of the polymer alloy.

In the present example, a liquid crystal material with a chiral dopant added thereto having an isotropy of refractive index Δn of 0.089 is used for the liquid crystal layer 115, and the thickness of the liquid crystal layer 115 is set to be about 4.5 μm.

Figure 10:
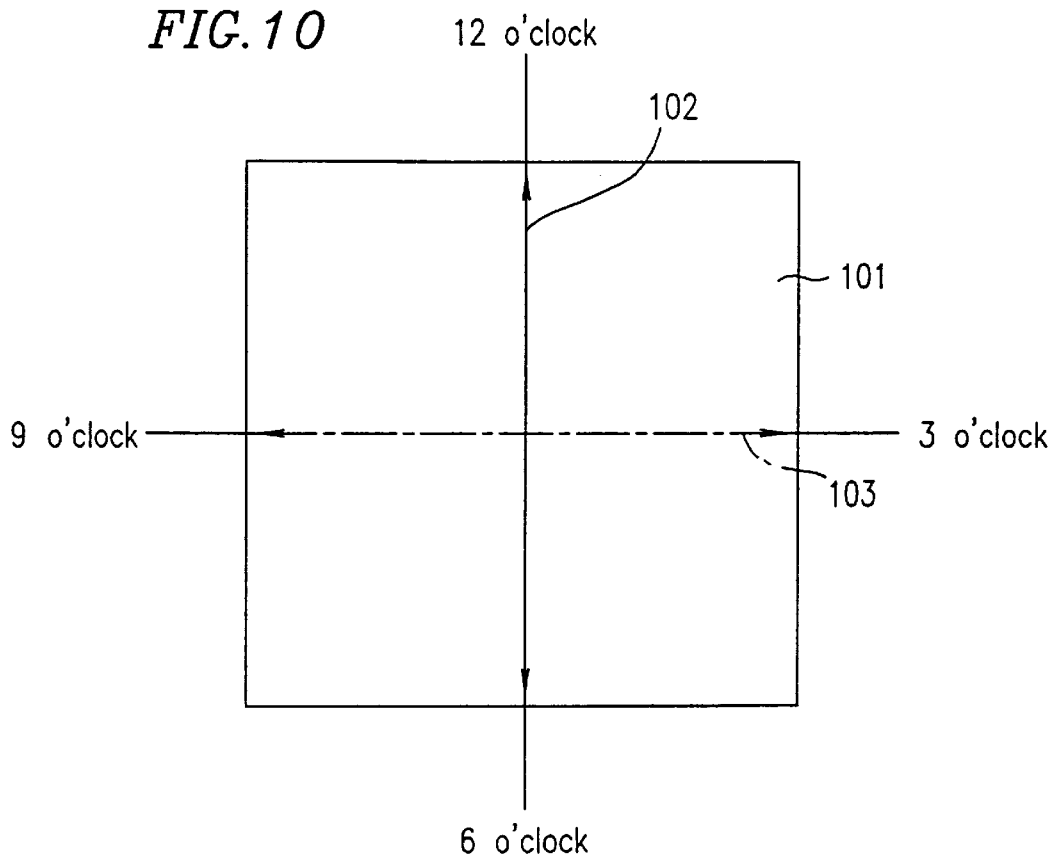
FIG. 10 is a plan view showing the setting direction of a polarizing plate in Example 2 according to the present invention.

FIG. 10 shows the direction in which the polarizing plates of the liquid crystal display apparatus 101 of Example 2 are placed. In the liquid crystal display apparatus 101, the polarizing plate 106 is placed in such a manner that an absorption axis 102 is almost parallel to a 6–12 o'clock direction, and the polarizing plate 107 is placed in such a manner that an absorption axis 103 is almost parallel to a 3–9 o'clock direction.

Figure 12:
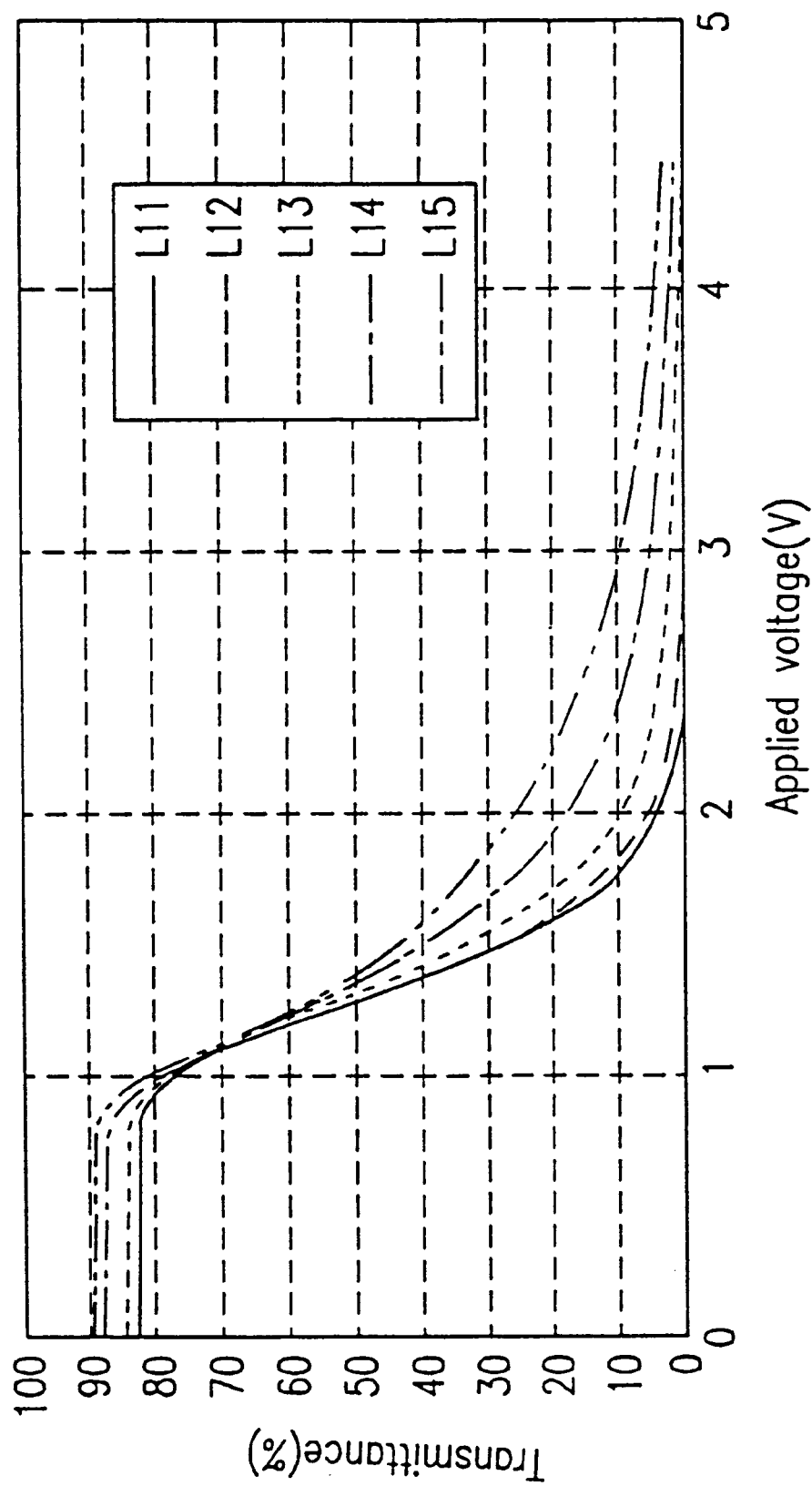
FIG. 12 is a graph showing a transmittance applied voltage characteristic in a 6 o'clock direction of the liquid crystal display apparatus in Example 2 according to the present invention.

The liquid crystal display apparatus 101 was placed in the measurement system shown in FIG. 3 in the same way as in Example 1, whereby the viewing angle dependence of the liquid crystal display apparatus 101 was measured. The result of the measurement is shown as a graph of transmittance-applied voltage characteristics in FIG. 12. FIG. 12 shows the result in the 6 o'clock direction. In FIG. 12, lines L13, L12, L13, L14 and L15 represent the cases of θ=0°, θ=10°, θ=20°, θ=30°, and θ=40°, respectively. As is understood from FIG. 12, even when the applied voltage is gradually increased from 0 volt to 4 volts at which a display is typically conducted, the transmittance measured at the position of θ=40° is about 5%. The same result was also obtained even, in the 12, 3, and 9 o'clock directions.

Comparative Example 2

Figure 14:
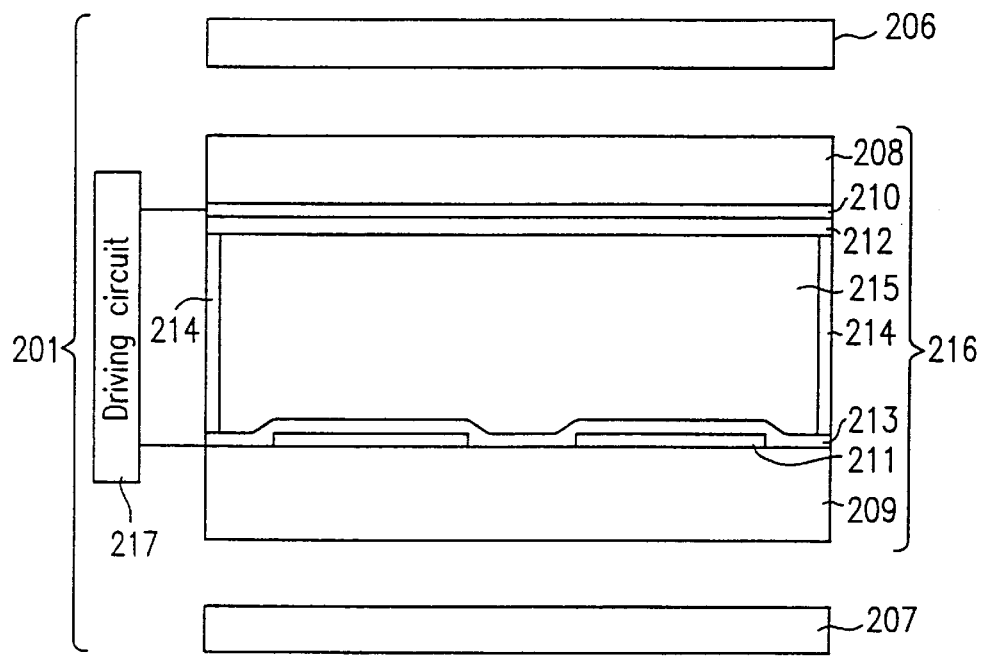
FIG. 14 is a cross-sectional view of a liquid crystal display apparatus in Comparative Example 2.

FIG. 14 is a cross-sectional view showing a structure of a liquid crystal display apparatus 201 of Comparative Example 2. The liquid crystal display apparatus 201 includes a liquid crystal display device 216 and a pair of polarizing plates 206 and 207. In the liquid crystal display device 216, substrates are provided on both sides thereof so as to interpose a liquid crystal layer 215. One substrate (placed on the upper side of FIG. 14) is provided with a transparent electrode 210 made of ITO on a surface of a base glass substrate 208 on the liquid crystal layer 215 side, and an alignment film 212 is formed on the transparent electrode 210. The other substrate (placed on the lower side of FIG. 14) is provided with a transparent electrode 211 made of ITO on a surface of a base glass substrate 209 on the liquid crystal layer 215 side, and an alignment film 213 is formed on the transparent electrode 211. The transparent electrodes 210 and 211 respectively have a predetermined width and are formed at a predetermined interval in such a manner as to be orthogonal to each other when seen in the direction of a normal line to the glass substrates 208 and 209. Overlapping portions of the transparent electrodes 210 and 211 form pixels contributing to a display. The pixels are provided in a matrix. As shown in FIG. 14, the liquid crystal layer 215 is sealed with a sealing resin, and the liquid crystal display device 216 is provided with a driving circuit 217.

The alignment films 212 and 213 are subjected to an alignment treatment by UV-irradiation or a special alignment treatment. Because of this, the liquid crystal molecules in contact with the alignment films 212 and 213 are controlled so as to be aligned in different directions in a plurality of regions between the respective alignment films 212 and 213, aligned in a radial shape, or randomly. Alternatively, the liquid crystal molecules can be controlled so as to have a random twist angle. Since the alignment films 212 and 213 are subjected to such treatment, the alignment state of the liquid crystal molecules is different in a plurality of regions of the liquid crystal layer 215 in the liquid crystal display device 216.

In the present example, a liquid crystal material with a chiral dopant added thereto having an isotropy of refractive index Δn of 0.089 is used for the liquid crystal layer 215, and the thickness of the liquid crystal layer 215 is set to be about 4.5 μm.

Figure 13:
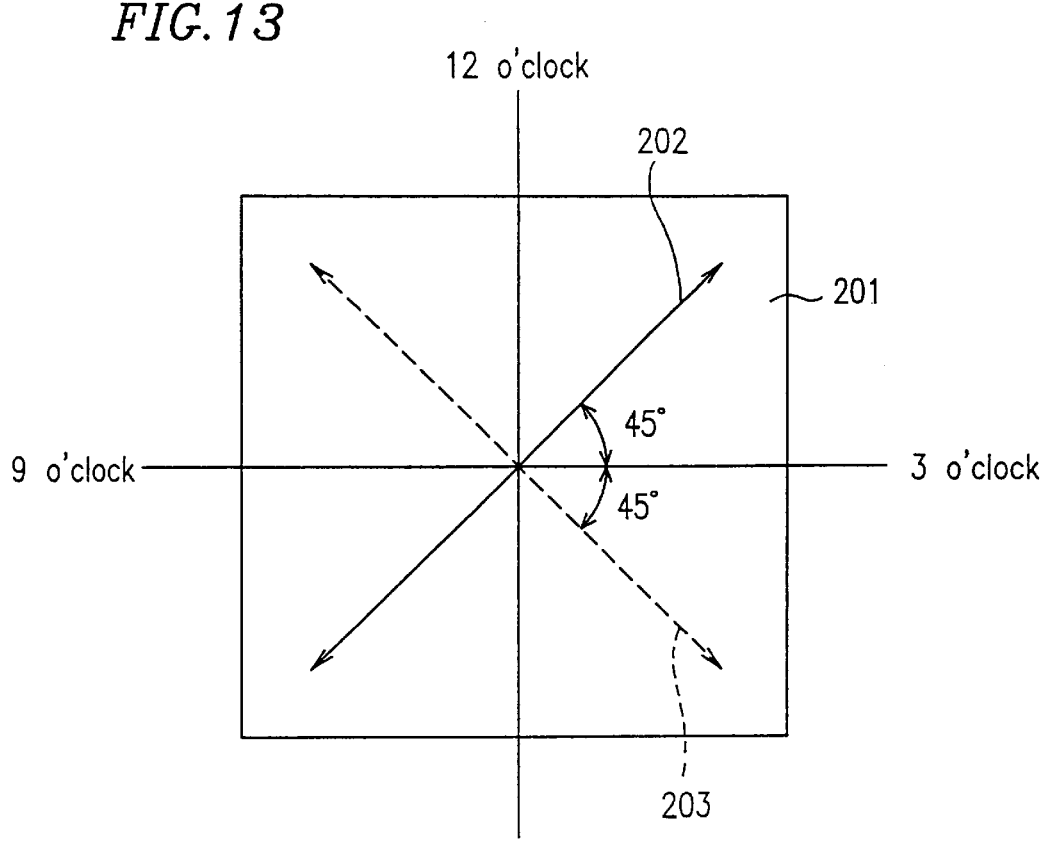
FIG. 13 is a plan view showing the setting direction of a polarizing plate in Comparative Example 2.

FIG. 13 shows the direction in which the polarizing plates of the liquid crystal display apparatus 201 of Comparative Example 2 are placed. In the liquid crystal display apparatus 201, the polarizing plate 206 is placed in such a manner that an absorption axis 202 forms an angle of about 45° with a 6–12 o'clock direction of the liquid crystal display device 216, and the polarizing plate 207 is placed in such a manner that an absorption axis 203 forms an angle of about 45° with a 3–9 o'clock direction.

Figure 15:
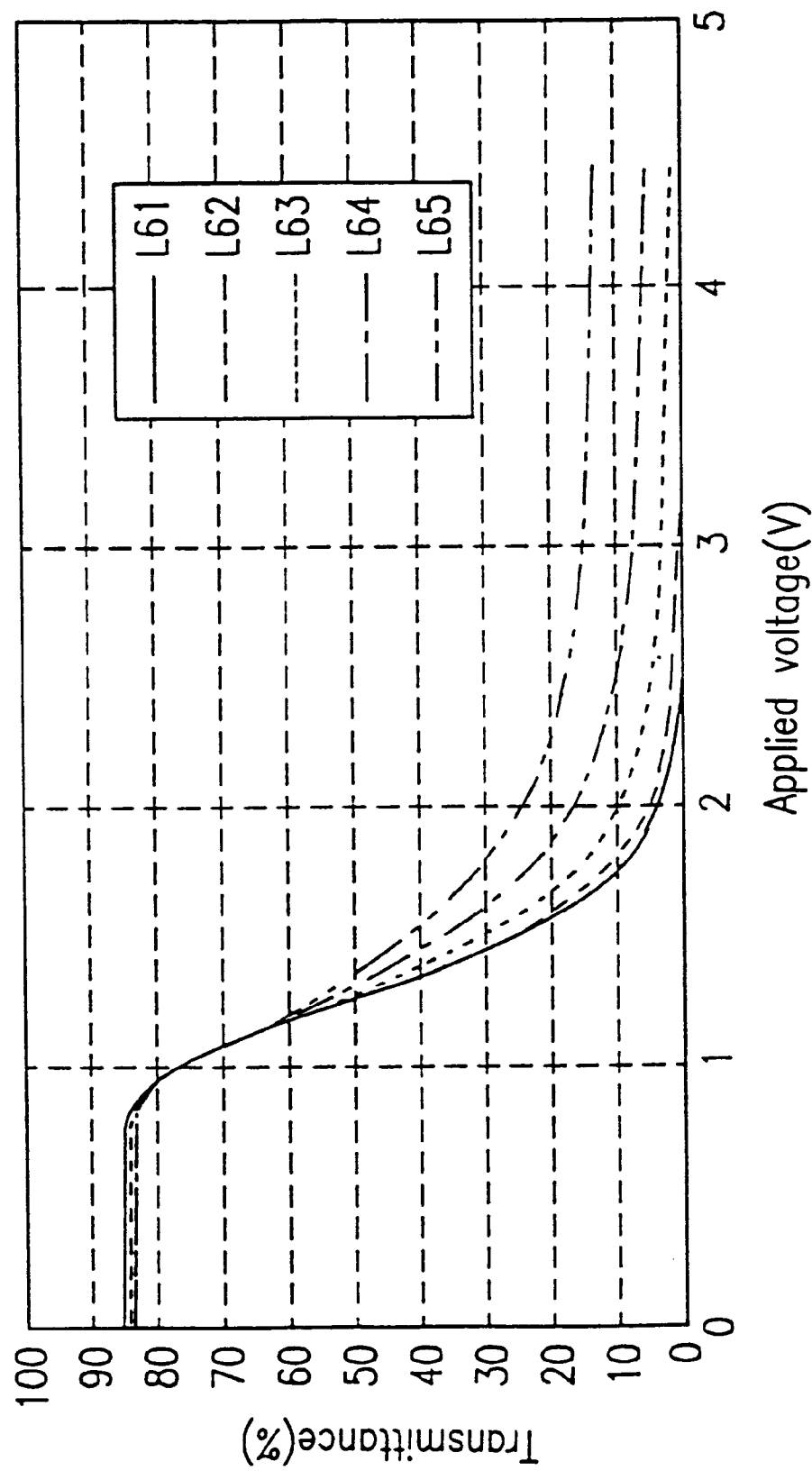
FIG. 15 is a graph showing a transmittance applied voltage characteristic in a 6 o'clock direction of the liquid crystal display apparatus in Comparative Example 2.

The liquid crystal display apparatus 201 was placed in the measurement system in shown in FIG. 3 in the same way as in Example 1, whereby the viewing angle dependence of the liquid crystal display apparatus 201 was measured. The result of the measurement is shown as a graph of transmittance-applied voltage characteristics in FIG. 15. FIG. 15 shows the result in the 6 o'clock direction. In FIG. 15, lines L61, L62, L63, L64 and L65 represent the cases of θ=0°, θ=10°, θ=20°, θ=30°, and θ=40°, respectively. As is understood from FIG. 15, even when the applied voltage is gradually increased from 0 volts to 4 volts at which a display is typically conducted, the transmittance measured at the position of θ=40° is more than 10%. The same result was also obtained even in the 12, 3, and 9 o'clock directions.

Thus, compared with Comparative Example 2, the liquid crystal display apparatus of Example 2 has remarkably improved viewing angle characteristics in the 6–12 o'clock and 3–9 o'clock directions and has outstanding visibility.

In Example 2, the liquid crystal display apparatus 101 in which the polarizing plates 106 and 107 are placed so that their absorption axes 102 and 103 are respectively parallel to the 6–12 o'clock direction and the 3–9 o'clock direction is exemplified. However, the same effect can also be obtained in the case where the absorption axis 102 is parallel to the 6–12 o'clock direction and the absorption axis 103 forms an angle of 90°±5° with the absorption axis 102 and in the case where the absorption axis 103 is parallel to the 3–9 o'clock direction and the absorption axis 102 forms an angle of 90°±5° with the absorption axis 103.

Furthermore, in Example 2, the liquid crystal display device 116 of a simple matrix type is described. However, the same result can also be obtained in the case where the liquid crystal display device 116 is of an active matrix type using an active switching element such as a TFT.

As described above, in Examples 1 and 2, the viewing angle is increased in the horizontal direction as well as in the vertical direction. Thus, the indispensable conditions of the increase in viewing angle in the horizontal direction, considering the shape of a screen which is becoming wider and the situation in which people watch a screen, and the improvement in gray-scale inversion can be satisfied.

In a liquid crystal display apparatus in which liquid crystal alignment is divided into at least two regions in each pixel, the contrast ratio in the horizontal direction changes less than that in the vertical direction irrespective of the characteristics of the polarizing plates, and a wide viewing angle with outstanding visibility can be realized by setting an absorption axis of either of upper and lower polarizing plates so as to be almost parallel to the 6–12 o'clock direction or the 3–9 o'clock direction and setting an angle formed by the absorption axis of the polarizing plate and the absorption axis of the other polarizing plate so as to be 90°±5°.

In a liquid crystal display apparatus in which liquid crystal alignment is divided into two regions in each pixel, the absorption axis of one polarizing plate is placed so as to be about ψ1/2 and the absorption axis of the other polarizing plate is placed so as to be about ψ2/2, and the angle formed by the absorption axis of one polarizing plate and the absorption axis of the other polarizing plate is set to be 90°±5°, whereby the grayscale inversion is eliminated in the horizontal direction and the viewing angle can be increased in the vertical direction, irrespective of the characteristics of the polarizing plates. Herein, ψ1 and ψ2 are angles formed by alignment directions of the liquid crystal molecules on upper and lower substrates. In addition, the changes in contrast ratio in the vertical direction and in the horizontal direction can be made the same.

Thus, the display quality of the liquid crystal display apparatus can be substantially improved,

EXAMPLE 3

Another example of the present invention will be described with reference to FIGS. 16 through 21.

Figure 16:
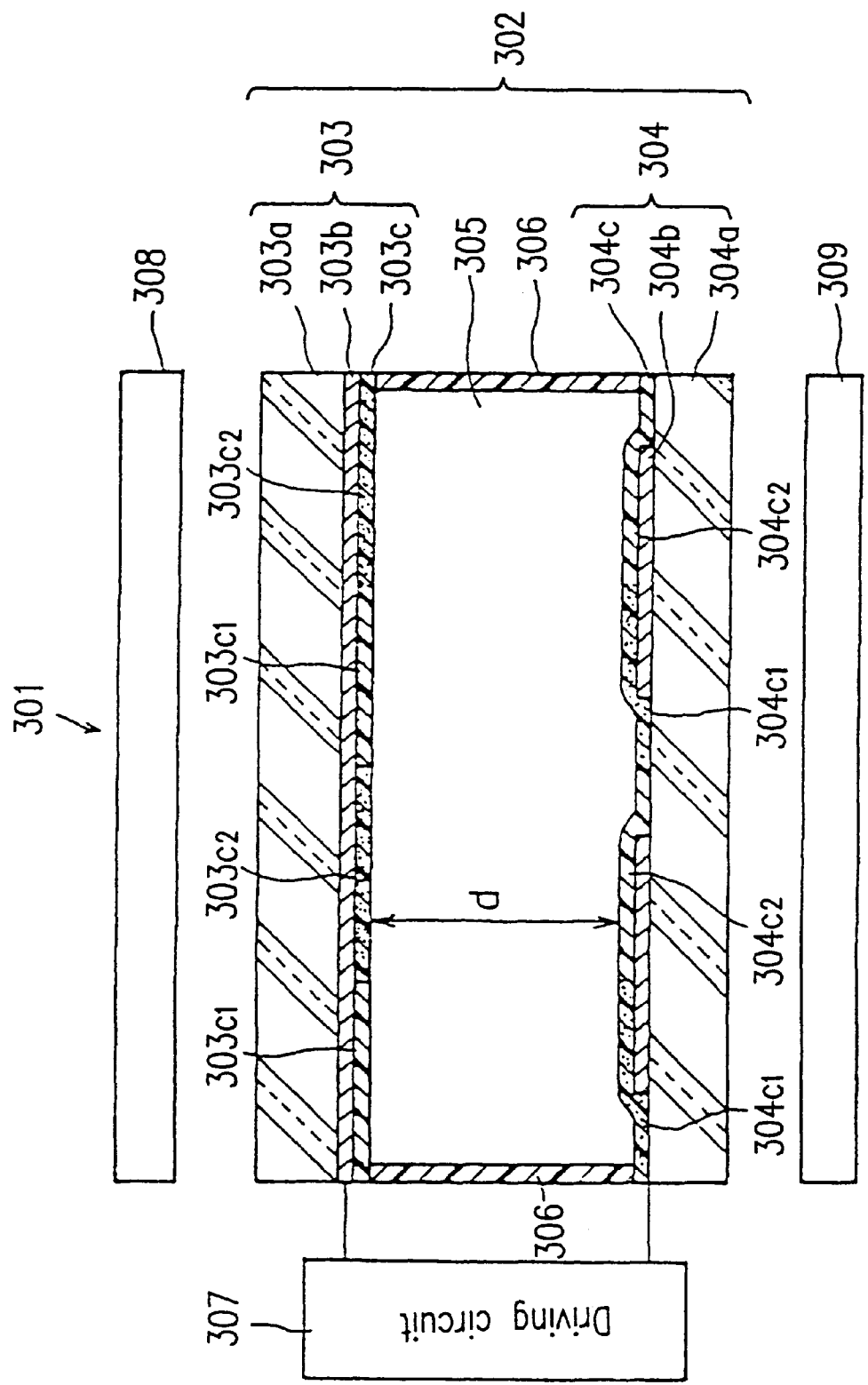
FIG. 16 is a cross-sectional view showing a schematic structure of a liquid crystal display apparatus in Example 3 according to the present invention.

FIG. 16 is a cross-sectional view showing a schematic structure of a liquid crystal display apparatus 301 of Example 3. The liquid crystal display apparatus 301 includes a liquid crystal display device 302. The liquid crystal display device 302 includes a pair of substrates 303 and 304 opposing each other and a liquid crystal layer 305 between the substrates 303 and 304.

In one substrate 303, a plurality of transparent electrodes 303b made of ITO are placed in parallel with each other on the surface of a base glass substrate 303a on the liquid crystal layer 305 side. An alignment film 303c is formed on the transparent electrode 303b. In the other substrate 304, a plurality of transparent electrodes 304b made of ITO are placed in parallel with each other on the surface of a glass substrate 304a on the liquid crystal layer 305 side. An alignment film 304c is formed on the transparent electrode 304b.

The transparent electrodes 303b and 304b respectively have a predetermined width and are formed at a predetermined interval in such a manner as to be orthogonal to each other when seen in the direction of a normal line to the glass substrates 303 and 304. Overlapping portions of the transparent electrodes 303b and 304b form pixels contributing to a display. The pixels are provided in a matrix.

The alignment films 303c and 304c are subjected to an alignment treatment, which regulate the alignment of liquid crystal molecules included in the liquid crystal layer 305 in such a manner that the liquid crystal molecules have a predetermined pretilt angle. The states of regions $303c_1$, and $303c_2$ of the alignment film $303c$ in each pixel are different from each other. Because of this, the pretilt angles of the liquid crystal molecules are different in the regions $303c_1$, and $303c_2$. More specifically, the pretilt angle of the liquid crystal molecules is relatively large in the region $303c_1$, and the pretilt angle of the liquid crystal molecules in the region $303c_2$ is relatively small. Similarly, the states of regions $304c_1$, and $304c_2$ of the alignment film $304a$ in each pixel are different from each other. Because of this, the pretilt angles of the liquid crystal molecules are different in the regions $304c_1$, and $304c_2$. More specifically, the pretilt angle of the liquid crystal molecules is relatively small in the region $304c_1$, and the pretilt angle of the liquid crystal molecules in the region $304c_2$, is relatively small. Accordingly, in the alignment film $303c$ (or $304c$), two regions $303c_1$, and $303c_2$ (or $304c_1$ and $304c_2$) which are different in pretilt angle are provided in each pixel, and the substrates 303 and 304 are attached to each other in such a manner that the region with a large pretilt angle opposes to the region with a small pretilt angle. Due to this, the tilt direction of the liquid crystal molecules is controlled so as to be opposite to each other in adjacent regions. In other words, each pixel includes two regions in which the tilt direction of the liquid crystal molecules is opposite to each other, and the liquid crystal alignment in each pixel is divided into two regions.

Furthermore, the substrates 303 and 304 are attached to each other so that the alignment direction of the alignment film $303c$ and that of the alignment film $304c$ form an angle of 90°.

Liquid crystal is sealed in the liquid crystal layer 305 with a sealant 306. The liquid crystal molecules are aligned so as to be twisted by 90° by the alignment films $303c$ and $304c$. The alignment of the liquid crystal molecules changes upon the application of a voltage.

In the liquid crystal display apparatus 301 of the present example, the product ($\Delta n \cdot d$) of the anisotropy of refractive index $\Delta n$ of a liquid crystal material to be used and the cell thickness d of the thickness of the liquid crystal layer 305 is adjusted to be in a predetermined range. This will be described later.

A driving circuit 307 is connected to each of the transparent electrodes $303b$ and $304b$. The driving circuit 307 supplies a driving voltage for a display to each of the transparent electrodes $303b$ and $304b$. Because of this, a voltage is applied to liquid crystal in each pixel in accordance with a display content, the alignment of the liquid crystal molecules is changed, and light is modulated and transmitted through the liquid crystal display device 302, whereby a display is conducted.

Furthermore, polarizing plates 308 and 309 are provided on the sides of the substrates 303 and 304 opposite to the liquid crystal layer 305. The directions of absorption axes of the polarizing plates 308 and 309 will be described later.

Next, a process for producing an alignment film of the liquid crystal display apparatus 301 will be described with reference to FIGS. 17A through 17C.

First, the transparent electrodes $303b$ and $304b$ are formed on the glass substrates $303a$ and $304a$. Alternatively, switching elements such as TFTs, signal lines, gate lines, and pixel electrodes are formed on one of the substrates, and a common electrode is formed on the other substrate. Then, polyimide is coated onto the transparent electrodes $303b$ and $304b$ and post-baked at 180° C. for about one hour to allow the polyimide to adhere to the transparent electrodes $303b$ and $304b$, whereby the alignment films $303c$ and $304c$ are formed.

Figure 17A:
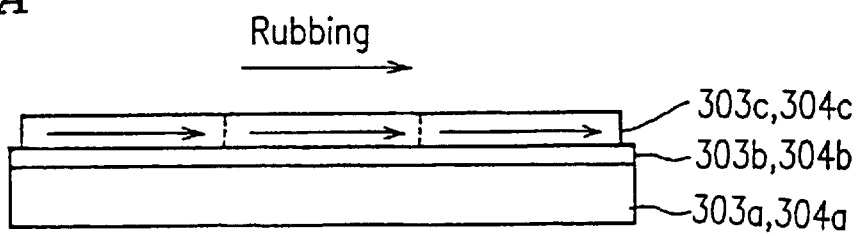
FIGS. 17A, through 17C illustrate the steps of producing an alignment film of the liquid crystal display apparatus in Example 3 according to the present invention.

Then, as shown in FIG. 17A, the alignment films $303c$ and $304c$ are subjected to rubbing. This allows the alignment films $303c$ and $304c$ to have directivity of controlling the alignment of the liquid crystal molecules in the rubbing direction.

Figure 17B:
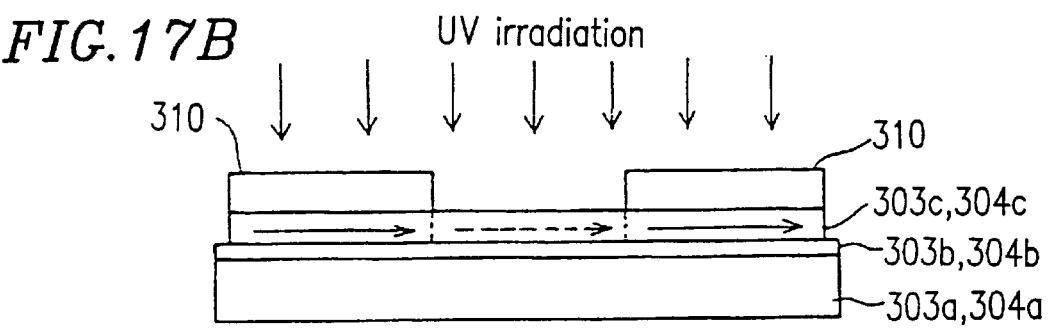

As shown in FIG. 17B, a part of each portion to be a pixel is covered with a photomask 310, and UV irradiation is conducted. Thereafter, the photomask 310 is removed with a special-purpose peeling solution. As a result, the alignment films $303c$ and $304c$ have portions irradiated with UV-light and portions not irradiated with UV-light.

Figure 17C:
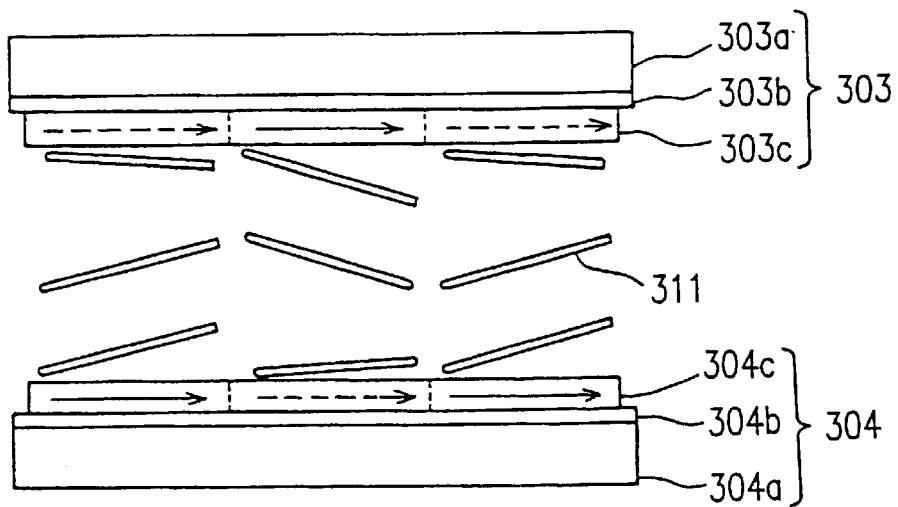

Two substrates 303 and 304 thus produced are attached to each other in such a manner that the portions irradiated with UV-light and the portions not irradiated with UV-light oppose to each other as shown in FIG. 17C. At this time, the substrates are attached to each other so that the alignment direction of the alignment film $303c$ forms an angle of 90° with the alignment direction of the alignment film $304c$. Thereafter, a liquid crystal material containing liquid crystal molecules 311 is sealed between the substrates 303 and 304.

In the portions irradiated with UV-light, the tilt angle of the liquid crystal molecules is small, whereas in the portions not irradiated with UV-light, the tilt angle of the liquid crystal molecules is large. Consequently, the liquid crystal molecules 311 are greatly affected by the portions with a large tilt angle and aligned as shown in FIG. 17C. More specifically, two regions into which the liquid crystal alignment is divided have opposite viewing angle characteristics.

In the case where liquid crystal alignment is divided into a plurality of portions in each pixel as described above, the viewing angle characteristics in the up and down direction (12–6 o'clock direction) and those in the right and left direction (3–9 o'clock direction) are completely different. When the viewing angle is tilted, the transmittance at a time of a black display becomes conspicuous and a satisfactory contrast cannot be obtained in the up and down direction. In this case, an inversion phenomenon occurs in the right and left direction. Thus, in the liquid crystal display apparatus 301, these problems are tried to be solved by optimizing the direction of the absorption axes of the polarizing plates 308 and 309.

Figure 18:
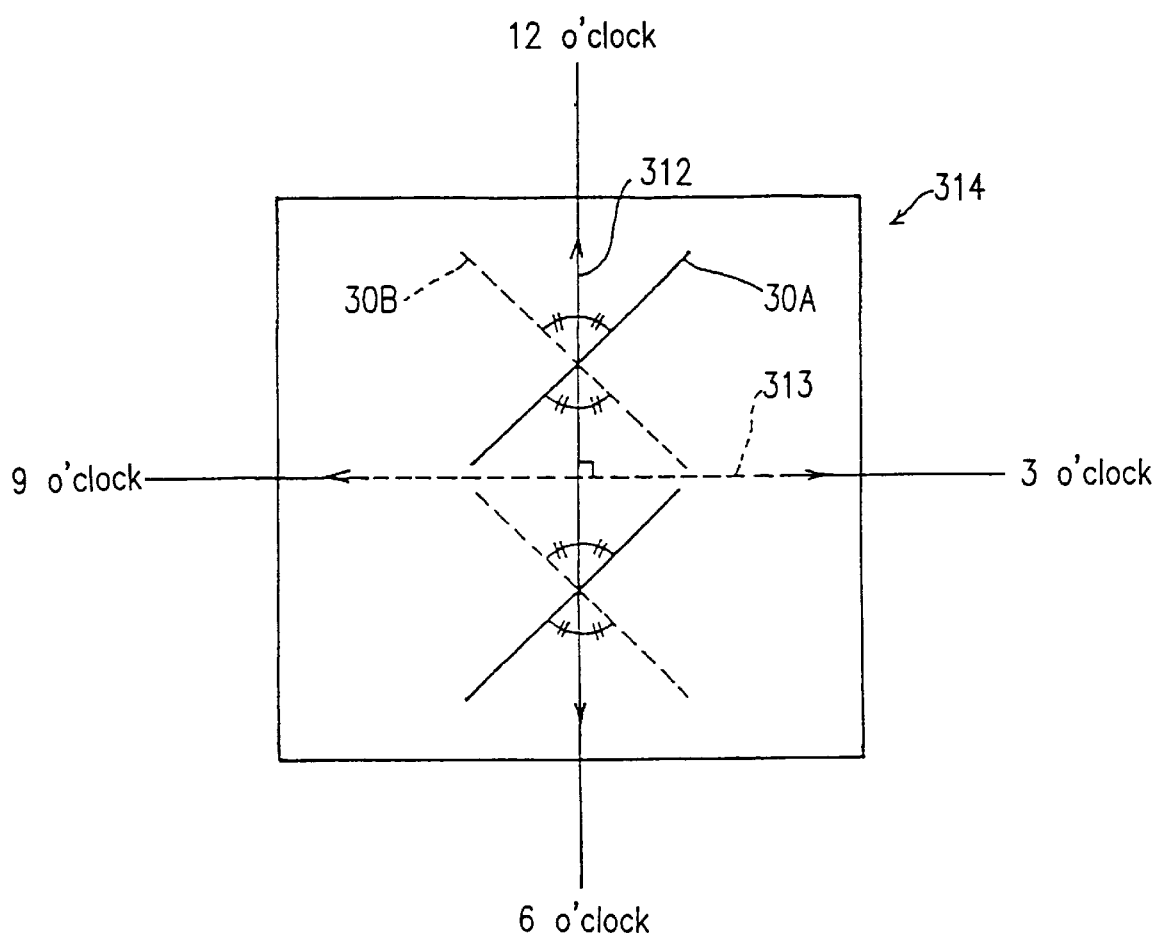
FIG. 18 is a plan view showing the setting direction of a polarizing plate of the liquid crystal display apparatus in Example 3 according to the present invention.

FIG. 18 is a plan, view showing the setting direction of absorption axes 312 and 313 of the polarizing plates 308 and 309 in the liquid crystal display apparatus 301 in which liquid crystal alignment is divided into two regions in each pixel 314. A 12–6 o'clock direction shown in this figure represents an up and down direction on a display screen, and a 3–9 o'clock direction represents a right and left direction on the display screen. A direction 30A represents an alignment direction of the liquid crystal molecules on the glass substrate $303a$ side, and a direction 30B represents an alignment direction of the liquid crystal molecules 311 on the glass substrate $304a$ side. The absorption axis 312 of the polarizing plate 308 and the absorption axis 313 of the polarizing plate 309 are respectively placed so as to bisect the angle formed by the direction 30A and the direction 30B. This can increase the viewing angle in the up and down direction and suppress a gray-scale inversion in the right and left direction. Thus, in the liquid crystal display apparatus 301, satisfactory viewing angle characteristics with an isotropically large viewing angle can be obtained.

However, as described above, in the case where liquid crystal alignment is divided into a plurality of regions in each pixel, and the absorption axes of the polarizing plates are respectively placed so as to bisect the angle formed by the alignment directions of the liquid crystal molecules on the upper and lower substrates, coloring (color shift) is likely to occur by using both of an ordinary ray component and an extraordinary ray component (the polarization direction of incident light has an angle with respect to the liquid crystal molecules positioned on the incident side of the liquid crystal layer). In order to obtain an optimum Δn·d value for preventing such coloring, the following experiment was conducted.

Seven liquid crystal display apparatuses each having the above-mentioned structure were produced. These apparatuses have different Δn·d values. The light transmittance at a time when the viewing angle was tilted from the normal line to a display surface under the application of a voltage for a white display was measured for each apparatus by the measurement system shown in FIG. 3, using monochromatic light with a wavelength of 450 nm (blue), 550 nm (green), and 650 nm (red). In these liquid crystal display apparatuses, the values Δn·d were 198.0 nm, 262.8 nm, 327.6 nm, 392.4 nm, 457.2 nm, 522.0 nm, and 586.8 nm.

Figure 19:
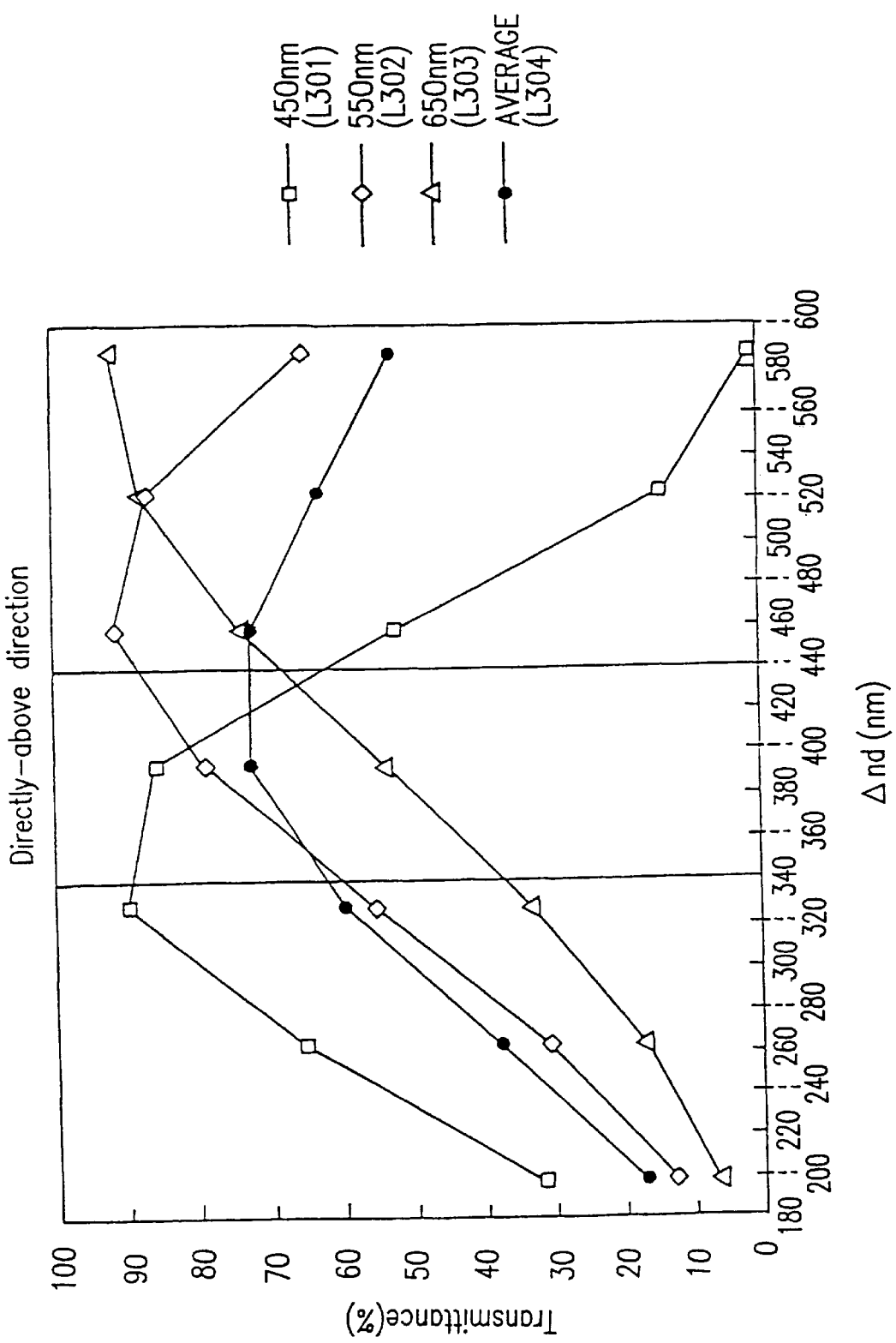
FIG. 19 is a graph showing a Δn·d dependence of transmittance in the direction directly above the liquid crystal display apparatus in Example 3 according to the present invention.
Figure 20:
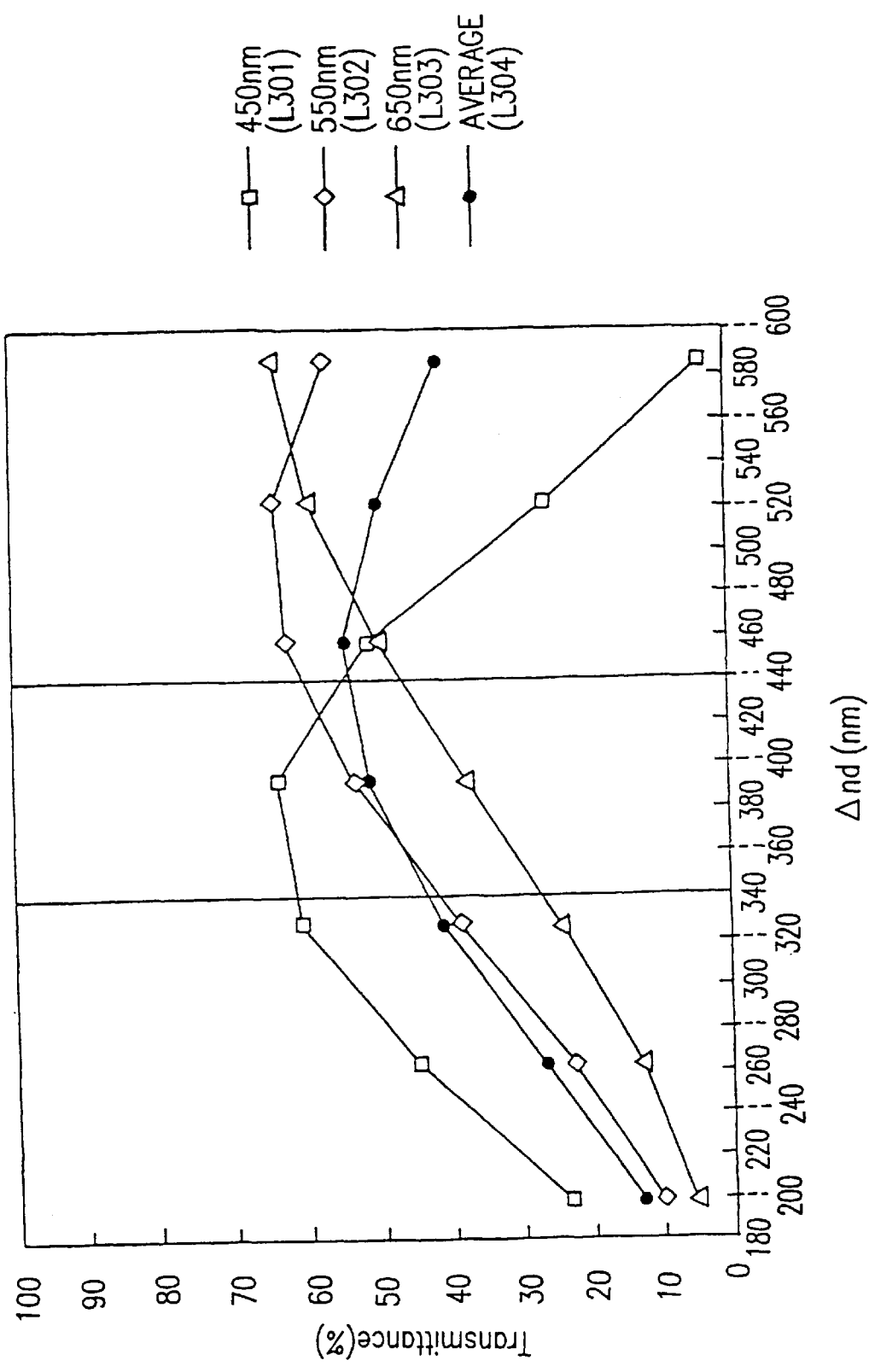
FIG. 20 is a graph showing a Δn·d dependence of transmittance when the viewing angle is tilted by 40° in a 12–6 o'clock direction in the liquid crystal display apparatus in Example 3 according to the present invention.
Figure 21:
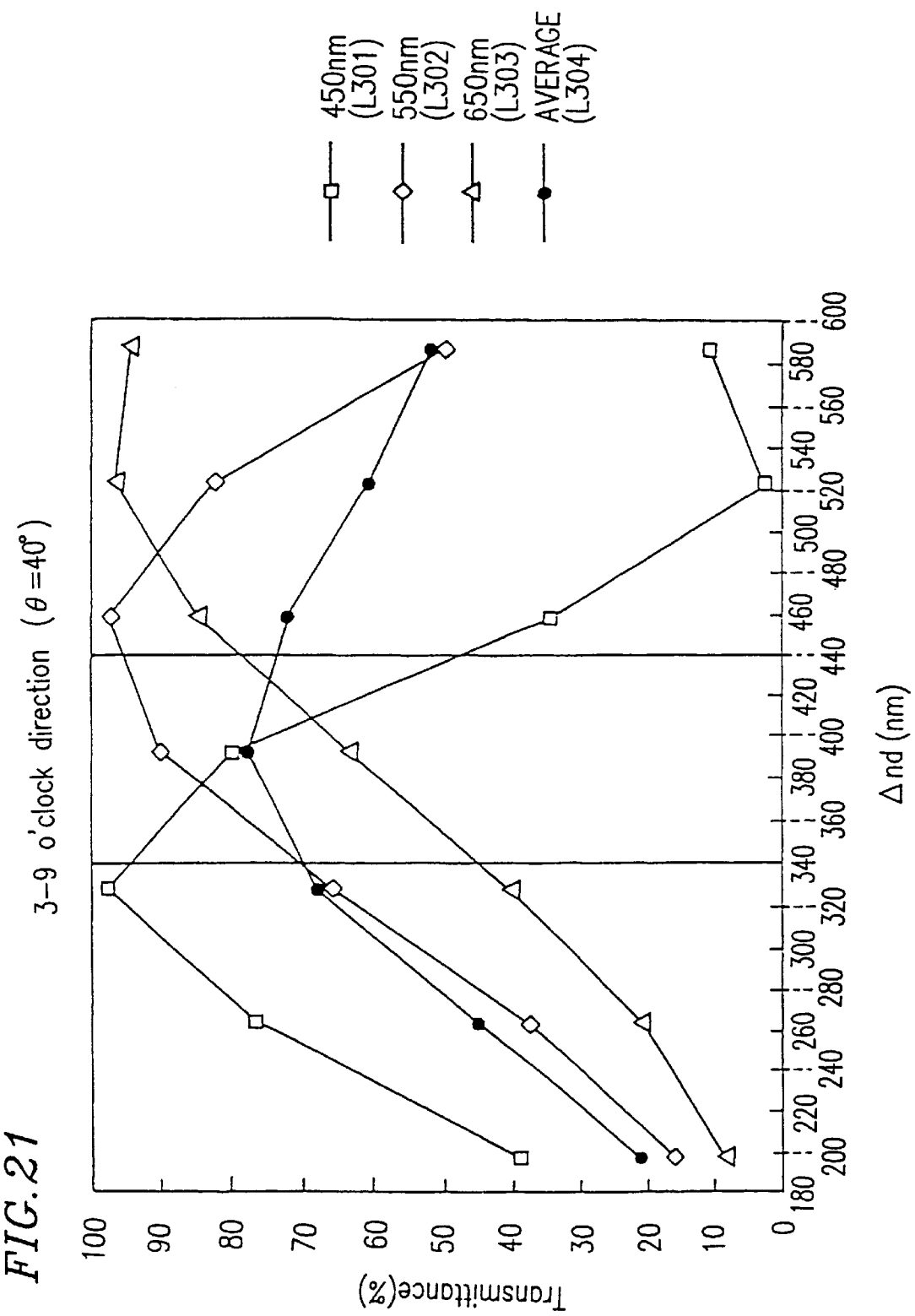
FIG. 21 is a graph showing a Δn·d dependence of transmittance when the viewing angle is tilted by 40° in a 3–9 o'clock direction In the liquid crystal display apparatus in Example 3 according to the present invention.

FIGS. 19 through 21 are graphs showing the results of the above measurement. FIG. 19 shows the Δn·d dependence of light transmittance in the directly-above direction (θ=0). FIG. 20 shows the Δn·d dependence of light transmittance in the direction (θ=40°) when the viewing angle is tilted by 40° in the 12–6 o'clock direction. FIG. 21 shows the Δn·d dependence of light transmittance in the direction (θ=40°) when the viewing angle is tilted by 40° in the 3–9 o'clock direction. In FIGS. 19 through 21, lines L301, L302, and L303 are results with respect to monochromatic light with a wavelength of 450 nm (blue), 550 nm (green), and 650 nm (red), and a line L304 represents the average of these results.

It is understood from FIGS. 19 through 21 that when the viewing angle is tilted, light transmittance is shifted to blue as a whole in the 12–6 o'clock direction, and light transmittance is shifted to yellow as a whole in the 3–9 o'clock direction. These experimental results agreed with the results obtained by a visual inspection. When the degree of a shift toga blue color at θ=40° in the 12–6 o'clock direction is almost equal to the degree of a shift to a yellow color at θ=40° in the 3–9 o'clock direction under the condition of Δn·d ≈395 nm, and the value Δn·d is in the range of 340 to 440 nm, particularly, in the range of 380 to 400 nm, a high quality panel without coloring can be realized. Actually, some samples in this range were produced and visually evaluated while a moving picture was being displayed in these samples. As a result, it was confirmed that a display quality was substantially improved without coloring when the viewing angle was tilted, while maintaining a color balance in the directly-above direction.

In a sample with Δn·d smaller than 340 nm, as shown in FIG. 19, the light transmittance in the directly-above direction, particularly, the light transmittance in the vicinity of 550 nm at which the highest visibility is obtained is low, so that a screen looks dark. Furthermore, as shown in FIG. 20, when the viewing angle is tilted in the 12–6 o'clock direction, the screen becomes darker. As shown in FIG. 21, when the viewing angle is tilted in the 3–9 o'clock direction, the transmittance of blue light increases. Therefore, in this case, the screen also looks dark.

In a sample with Δn·d larger than 440 nm, as shown in FIG. 19, the light transmittance in the directly-above direction is high. However, as shown in FIG. 21, when the viewing angle is tilted in the 3–9 o'clock direction, the transmittance of green light increases and the transmittance of blue light decreases. Therefore, the degree of a yellow color on a panel increases, resulting in the degradation of an image.

A sample with Δn·d in a range of 340 to 440 nm was compared with a sample with Δn·d out of a range of 340 to 440 nm while a moving picture was being displayed in these samples. As a result, it was confirmed that high quality display characteristics with outstanding visibility were obtained in the sample with Δn·d in a range of 340 to 440 nm. In this sample, there was no coloring in the directly-above direction, and no color shift occurred when the viewing angle was tilted.

As is apparent from the above experimental result, the color balance in the directly-above direction can be maintained and the coloring can be prevented when the viewing angle is tilted, by setting Δn·d of the liquid crystal display apparatus 301 with the above structure in the range of 340 to 440 nm. More preferable value Δn·d is in the range of 380 to 400 nm, In this range, high quality display characteristics with an isotropically large viewing angle, a satisfactory color balance, and outstanding visibility can be obtained.

As described above, in the liquid crystal display apparatus 301 of the present example, liquid crystal alignment is divided into two regions in each pixel 314, the absorption axes 312 and 313 of the polarizing plates 308 and 309 are placed so as to bisect the angle formed by the alignment direction of the liquid crystal molecules 311 on the substrate 303 side and the alignment direction of the liquid crystal molecules 311 on the substrate 304 side, and Δn·d is in the range of 340 to 440 nm. This allows the viewing angle in the up and down direction on a display screen (12–6 o'clock direction) to be increased and the gray-scale inversion in the right and left direction (3–9 o'clock direction) to be suppressed. Thus, satisfactory viewing angle characteristics with an isotropically large viewing angle can be obtained. Furthermore, display characteristics with a satisfactory color balance of transmitted light and outstanding visibility can be realized by setting the value Δn·d in the range of 340 to 440 nm.

EXAMPLE 4

Referring to FIGS. 17A through 17C and 22 through 25, Example 4 of the present invention will be described. For convenience of the description, the same members as those of Example 4 are denoted with the same reference numerals, and the description thereof will be omitted.

The liquid crystal display apparatus of the present example has almost the same structure as that of the liquid crystal display apparatus 301 shown in FIG. 16. However, the alignment treatment of the alignment films 303a and 304c are different from that of the liquid crystal display apparatus 301. In the liquid crystal display apparatus of the present example, liquid crystal alignment is divided into 4 regions in each pixel.

Figure 23A:
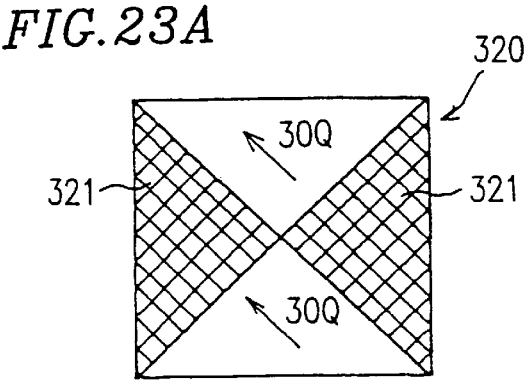
FIGS. 23A and 23B illustrate the steps of producing an alignment film in the liquid crystal display apparatus in Example 4 according to the present inven tion.

The steps of producing the alignment films 303c and 304c of the liquid crystal display apparatus of the present example will be described with reference to FIGS. 17A, 17B, 17C, 23A, and 23B. First, the alignment films 303c and 304c are formed. Then, as shown in FIG. 23A, each pixel 320 is patterned using a photoresist 321, whereby two regions are exposed. Thereafter, an alignment treatment shown in FIGS. 17A and 17B is conducted. More specifically, two regions in each pixel 320 is subjected to rubbing in the rubbing direction, and then, UV-light is irradiated to these regions under the condition that one of the regions is covered with the photomask 310. After the UV-irradiation, the photomask 310 is removed with a special-purpose peeling solution, and the photoresist 321 is removed.

Figure 23B:
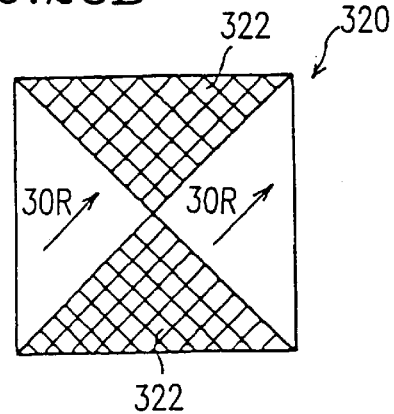

Next, as shown in FIG. 23B, each pixel 320 is patterned using a photoresist 322, whereby two regions which have been covered with the photoresist 321 are exposed. Then, the alignment treatment shown in FIG. 17A and 17B is conducted. Here, two regions exposed in each pixel 320 are subjected to rubbing in a direction 30R orthogonal to the rubbing direction 30Q. Thereafter, UV-light is irradiated to these regions under the condition that one of the regions is covered with the photomask 310. After the UV-irradiation, the photomask 310 is removed with a special-purpose peeling solution, and the photoresist 322 is removed.

Two substrates 303 and 304 thus produced are attached to each other in such a manner that portions irradiated with UV-light oppose to portions not irradiated with UV-light, as shown in FIG. 17C. At this time, the substrates 303 and 304 are attached to each other in such a manner that the alignment direction of the alignment film 303c forms an angle of 90° with the alignment direction of the alignment film 304c. Thereafter, a liquid crystal material containing the liquid crystal molecules 311 is sealed between the substrates 303 and 304.

Figure 22:
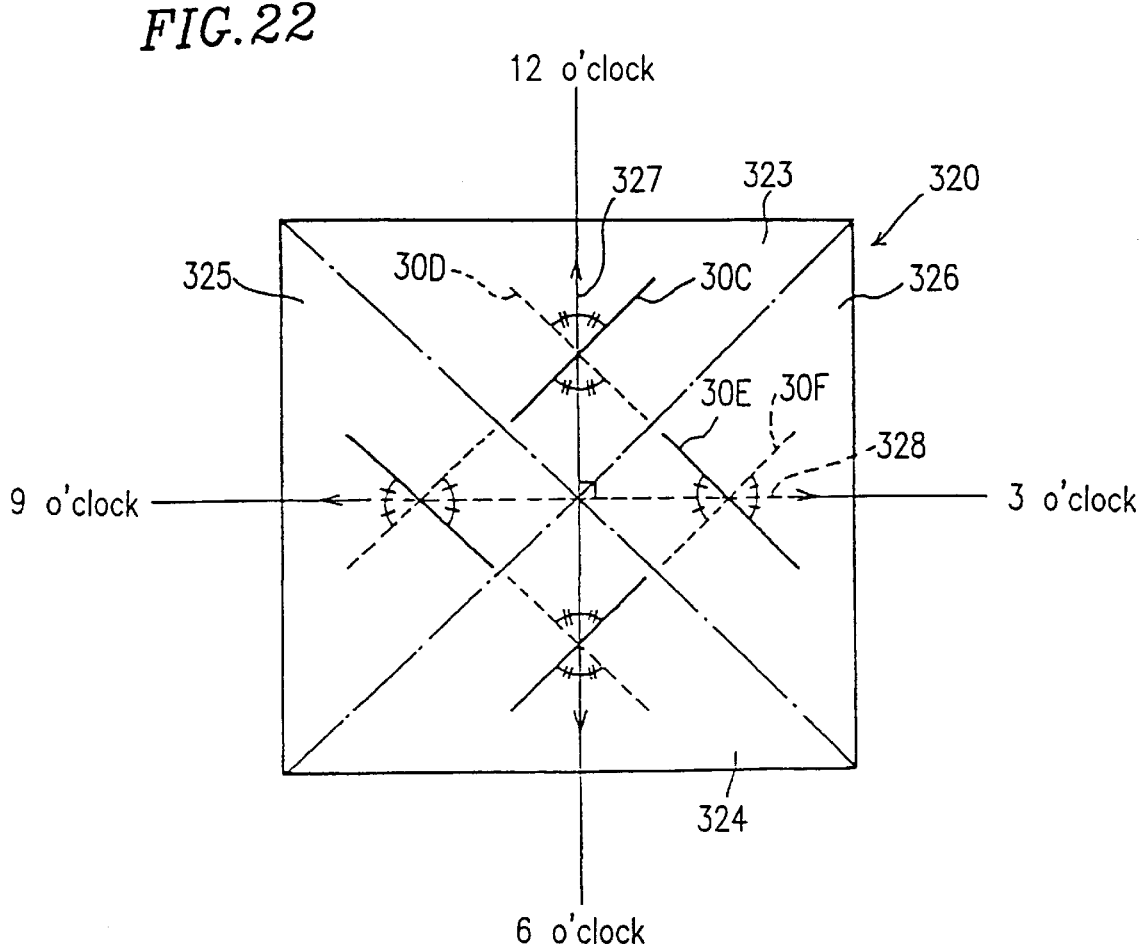
FIG. 22 illustrates the state in which liquid crystal alignment is divided into 4 regions in each pixel and the setting direction of a polarizing plate in a liquid crystal display apparatus in Example 4 according to the present invention.

As a result of the above-mentioned alignment treatment, liquid crystal alignment is divided into 4 regions in each pixel 320. More specifically, as shown in FIG. 22, in regions 323 and 324, the alignment direction of the liquid crystal molecules 311 on the glass substrate 303a side becomes a direction 30C, and the alignment direction of the liquid crystal molecules 311 on the glass substrate 304a side becomes a direction 30D. Furthermore, regions 323 and 324 are controlled so that the tilt directions of the liquid crystal molecules 311 in these regions are opposite to each other. On the other hand, in regions 325 and 326, the alignment direction of the liquid crystal molecules 311 on the glass substrate 303a side becomes a direction 30E, and the alignment direction of the liquid crystal molecules 311 on the glass substrate 304a side becomes a direction 30F. Furthermore, regions 325 and 326 are controlled so that the tilt directions of the liquid crystal molecules 311 in these regions are opposite to each other.

The polarizing plate 308 is placed in such a manner that an absorption axis 327 bisects the angle formed by the directions, and the polarizing plate 309 is placed in such a manner that an absorption axis 328 bisects the angle formed by the directions.

Because of the above-mentioned structure, the viewing angle in the up and down direction on a screen surface can be increased, and the gray-scale inversion in the right and left direction can be suppressed. Thus, satisfactory viewing angle characteristics with an isotropically large viewing angle can be obtained.

In order to obtain an optimum $\Delta n \cdot d$ value for preventing such coloring, the, following experiment was conducted in the same way as in Example 3.

Seven liquid crystal display apparatuses each having the above-mentioned structure were produced. These apparatuses have different $\Delta n \cdot d$ values. The viewing angle characteristics of each apparatus were measured in the same way as in Example 3. In these liquid crystal display apparatuses, the values $\Delta n \cdot d$ were 198.0 nm, 262.8 nm, 327.6 nm, 392.4 nm, 457.2 nm, 522.0 nm, and 586.8 nm.

Figure 24:
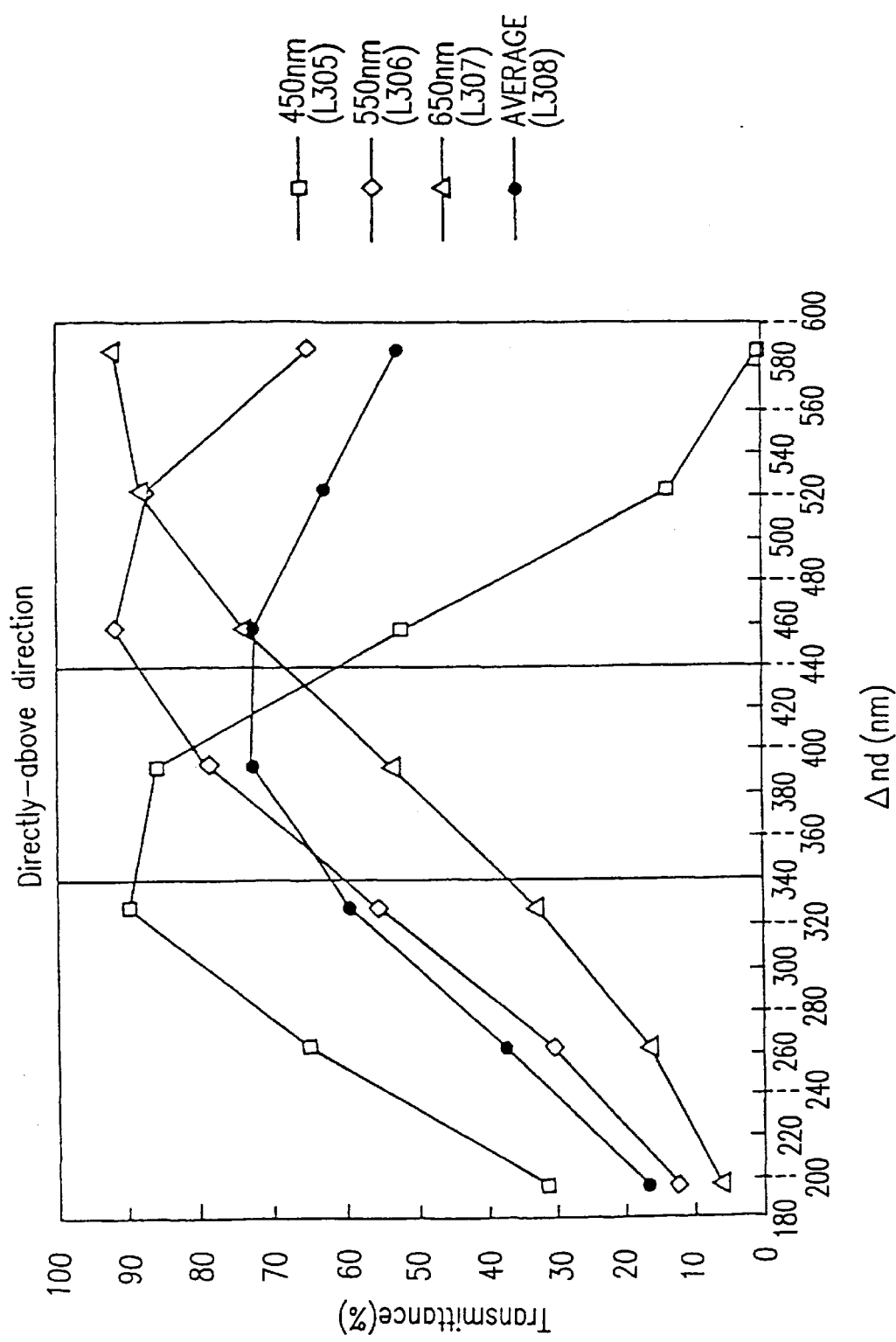
FIG. 24 is a graph showing a Δn·d dependence of transmittance in the direction directly above the liquid crystal display apparatus in Example 4 according to the present invention.
Figure 25:
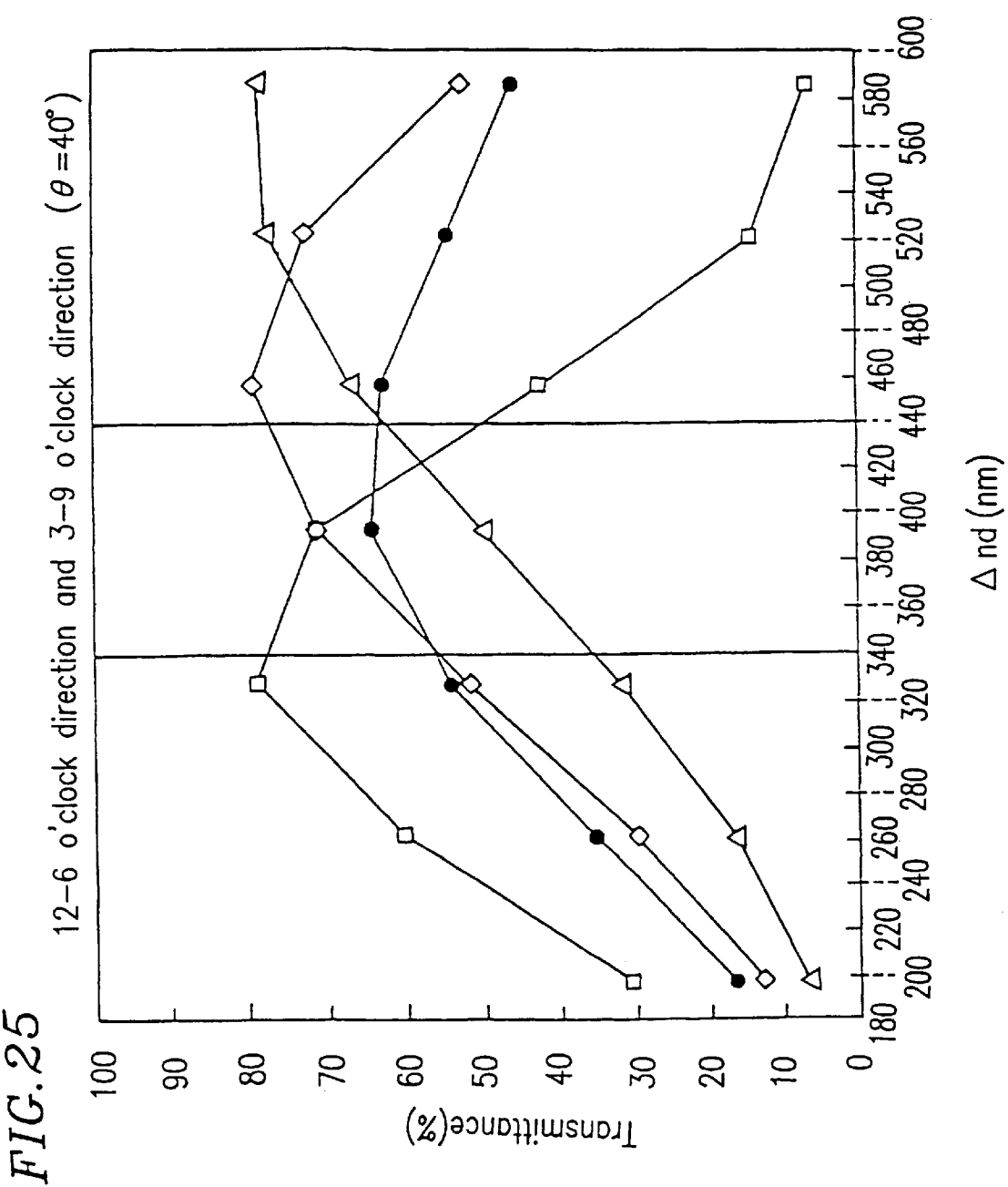
FIG. 25 is a graph showing a Δn·d dependence of transmittance when the viewing angle is tilted by 40° in 12–6 o'clock and 3–9 o'clock directions in the liquid crystal display apparatus in Example 4 according to the present invention.

FIGS. 24 and 25 are graphs showing the results of the above measurement. FIG. 24 shows the $\Delta n \cdot d$ dependence of light transmittance in the directly-above direction ($\theta=0$). FIG. 25 shows the $\Delta n \cdot d$ dependence of light transmittance in the direction ($\theta=40°$) when the viewing angle is tilted by 40° in the 12–6 o'clock direction and in the 3–9 o'clock direction. In the liquid crystal display apparatus in which liquid crystal alignment is divided into 4 regions in each pixel, almost the same viewing angle characteristics were shown in the 12–6 o'clock direction and in the 3–9 o'clock direction. In FIGS. 24 and 25, lines L305, L306, and L307 are results with respect to monochromatic light with a wavelength of 450 nm (blue), 550 nm (green), and 650 nm (red), and a line L308 represents the average of these results.

As shown in FIGS. 24 and 25, when the value $\Delta n \cdot d$ is in the range of 340 to 440 nm, particularly, in the range of 380 to 400 nm, a high quality panel without coloring can be realized. It was confirmed that, in the liquid crystal display apparatus in which liquid crystal alignment is divided into 4 regions in each pixel, the display quality can be further improved by setting the value $\Delta n \cdot d$ in this range.

In a sample with $\Delta n \cdot d$ smaller than 340 nm, as shown in FIG. 25, when the viewing angle is tilted, a screen becomes bluish and looks dark. In a sample with $\Delta n \cdot d$ larger then 440 nm, the degree of a yellow color on a panel increases, resulting in the degradation of an image.

A sample with $\Delta n \cdot d$ in a range of 340 to 440 nm was compared with a sample with $\Delta n \cdot d$ out of a range of 340 to 440 nm while a moving picture was being displayed in these samples. As a result, it was confirmed that high quality display characteristics with outstanding visibility were obtained in the sample with $\Delta n \cdot d$ in a range of 340 to 440 nm. In this sample, there was no coloring in the directly-above direction, and no color shift occurred when the viewing angle was tilted.

As is apparent from the above experimental results, in the liquid crystal display apparatus in which liquid crystal alignment is divided into 4 regions in each pixel, the coloring can be suppressed when the viewing angle is tilted while maintaining a color balance in the directly-above direction, by setting the value $\Delta n \cdot d$ in the range of 340 to 440 nm. More preferable value $\Delta n \cdot d$ is in the range of 380 to 400 nm. When the value $\Delta n \cdot d$ is in this range, high quality display characteristics which have an isotropically large viewing angle, a satisfactory color balance, and outstanding visibility can be obtained.

As described above, in the liquid crystal display apparatus of the present example, liquid crystal alignment is divided into 4 regions in each pixel, the polarizing plates 308 and 309 are respectively placed in such a manner that the absorption axes 327 and 328 bisect the angle formed by the alignment direction of the liquid crystal molecules 311 on the substrate 303 side and the alignment direction of the liquid crystal molecules 311 on the substrate 304 side, and the value $\Delta n \cdot d$ is in the range of 340 to 440 nm. This allows the viewing angle in the up and down direction on a display screen (12–6 o'clock direction) to be increased and the gray-scale inversion in the right and left direction (3–9 o'clock direction) to be suppressed. Thus, satisfactory viewing angle characteristics with an isotropically large viewing angle can be obtained. Furthermore, display charaoteristics with a satisfactory color balance of transmitted light and outstanding visibility can be realized by setting the value $\Delta n \cdot d$ in the range of 340 to 440 nm.

As described above, the liquid crystal display apparatuses in Examples 3 and 4 have a structure in which liquid crystal alignment is divided into 2 or 4 regions in each pixel, absorption axes of a pair of polarizing plates are placed so as to bisect or substantially bisect the angle formed by the alignment direction of the liquid crystal molecules on one substrate side of a pair of substrates and the alignment direction of the liquid crystal molecules on the other substrate side, and the value $\Delta n \cdot d$ is in the range of 340 to 440 nm.

Because of the above structure, the viewing angle in the up and down direction on a display screen can be increased, and the gray-scale inversion in the right and left direction can be suppressed. Thus, satisfactory viewing angle characteristics with an isotropically large viewing angle can be obtained.

Furthermore, by setting the value Δn·d in the range of 340 to 440 nm, the coloring can be suppressed when the viewing angle is tilted, while maintaining the color balance in the directly-above direction. Thus, outstanding display characteristics with a satisfactory color balance of transmitted light can be realized.

High quality display characteristics without any coloring, having an isotropically large viewing angle and a satisfactory color balance of transmitted light can be obtained by setting the value Δn·d, preferably in the range of 380 to 400 nm.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus having a plurality of pixels arranged in a matrix, comprising:
    a pair of substrates opposing each other;
    a liquid crystal layer placed between the pair of substrates;
    an alignment film formed on a surface of each of the pair of substrates opposing the liquid crystal layer and subjected to a treatment for aligning liquid crystal molecules in the liquid crystal layer;
    a pair of polarizing plates placed so as to interpose the pair of substrates; and wherein:
        the liquid crystal layer corresponding to each pixel has at least two liquid crystal regions, each of the liquid crystal regions having an alignment state different from those of the other liquid crystal regions,
        one of the pair of polarizing plates has an absorption axis which is substantially parallel to a 6–12 o'clock direction, while the other one of the pair of polarizing plates has an absorption axis which is substantially parallel to a 3–9 o'clock direction,
        the absorption axes of the pair of polarizing plates substantially bisect an angle formed between directions of the alignment treatments performed on each of the pair of substrates in each of the liquid crystal regions, and
        a boundary between adjacent pairs of the liquid crystal regions is substantially in a same direction as a direction of the alignment treatment performed on a surface each of the alignment film.

2. A liquid crystal display apparatus having a plurality of pixels arranged in a matrix, comprising:
    a pair of substrates opposing each other;
    a liquid crystal layer placed between the pair of substrates;
    an alignment film formed on a surface of each of the pair of substrates opposing the liquid crystal layer and subjected to a treatment for aligning liquid crystal molecules in the liquid crystal layer;
    a pair of polarizing plates placed so as to interpose the pair of substrates; and wherein:
        the liquid crystal layer corresponding to each pixel has at least two liquid crystal regions, each of the liquid crystal regions having an alignment state different from those of the other liquid crystal regions,
        one of the pair of polarizing plates has an absorption axis which is substantially parallel to a 6–12 o'clock direction, while the other one of the pair of polarizing plates has an absorption axis which is substantially parallel to a 3–9 o'clock direction,
        the absorption axes of the pair of polarizing plates substantially bisect an angle formed between directions of the alignment treatments performed on each of the pair of substrates in each of the liquid crystal regions,
        a relationship $\phi1+\phi2=180°$ is satisfied, where $\phi1$ denotes a twist angle of the liquid crystal molecules in one of the liquid crystal regions, and $\phi2$ denotes a twist angle of the liquid crystal molecules in another one of the liquid crystal regions, and
        the absorption axis of one of the pair of polarizing plates substantially bisects $\phi1$, and the absorption axis of the other one of the pair of polarizing plates substantially bisects $\phi2$.

3. A liquid crystal display apparatus having a plurality of pixels arranged in a matrix, comprising:
    a pair of substrates opposing each other;
    a liquid crystal layer placed between the pair of substrates;
    an alignment film formed on a surface of each of the pair of substrates opposing the liquid crystal layer and subjected to a treatment for aligning liquid crystal molecules in the liquid crystal layer;
    a pair of Polarizing plates placed so as to interpose the pair of substrates; and wherein:
        the liquid crystal layer corresponding to each pixel has at least two liquid crystal regions, each of the liquid crystal regions having an alignment state different from those of the other liquid crystal regions,
        one of the pair of polarizing plates has an absorption axis which is substantially parallel to a 6–12 o'clock direction, while the other one of the pair of polarizing plates has an absorption axis which is substantially parallel to a 3–9 o'clock direction,
        the absorption axes of the pair of polarizing plates substantially bisect an angle formed between directions of the alignment treatments performed on each of the pair of substrates in each of the liquid crystal regions, and
        wherein, in the case where the liquid crystal display apparatus is of a normally white mode, transmittance is less than 5% regardless of a viewing angle when observed in the 6 o'clock direction, and when a black display voltage is applied the transmittance is 10% of less regardless of a viewing angle when observed in the 3 or 9 o'clock directions.

4. A liquid crystal display apparatus having a plurality of pixels arranged in a matrix, comprising;
    a pair of substrates opposing each other;
    a liquid crystal layer Placed between the pair of substrates;
    an alignment film formed on a surface of at least one of the pair of substrates opposing the liquid crystal layer and subjected to a treatment for aligning liquid crystal molecules in the liquid crystal layer;
    a pair of polarizing plates placed so as to interpose the pair of substrates; and wherein:
        the liquid crystal layer is in a horizontal orientation type ECB mode, the liquid crystal layer corresponding to each pixel is divided into at least a first liquid crystal region and a second liquid crystal region, the first liquid crystal region and the second liquid crystal region respectively have a first alignment state and a second alignment state which are different from each other, retardation of the liquid crystal layer is in a range of 340 nm to 440 nm, one of the pair of polarizing plates has an absorption axis which is substantially parallel to a 6–12 o'clock direction, while the other one of the pair of polarizing plates has an absorption axis which is substantially parallel to a 3–9 o'clock direction, and a boundary between adjacent pairs of the liquid crystal regions is substantially in a same direction as a direction of the alignment treatment performed on a surface of the alignment film.

5. A liquid crystal display apparatus having a plurality of pixels arranged in a matrix, comprising:

a pair of substrates opposing each other;

a liquid crystal layer placed between the pair of substrates;

an alignment film formed on a surface of at least one of the pair of substrates opposing the liquid crystal layer and subjected to a treatment for aligning liquid crystal molecules in the liquid crystal layer;

a pair of polarizing plates placed so as to interpose the pair of substrates; and wherein:

the liquid crystal layer is in a horizontal orientation type ECB mode, the liquid crystal layer corresponding to each pixel is divided into at least a first liquid crystal region and a second liquid crystal region, the first liquid crystal region and the second liquid crystal region respectively have a first alignment state and a second alignment state which are different from each other, retardation of the liquid crystal layer is in a range of 340 nm to 440 nm, one of the pair of polarizing plates has an absorption axis which is substantially parallel to a 6–12 o'clock direction, while the other one of the pair of polarizing plates has an absorption axis which is substantially parallel to a 3–9 o'clock direction, a relationship $\phi1+\phi2=180°$ is satisfied, where $\phi1$ denotes a twist angle of the liquid crystal molecules in the first liquid crystal region, and $\phi2$ denotes a twist angle of the liquid crystal molecules in the second liquid crystal region, and the absorption axis of one of the pair of polarizing plates substantially bisects $\phi1$, and the absorption axis of the other one of the pair of polarizing plates substantially bisects $\phi2$.

6. A liquid crystal display apparatus having a plurality of pixels arranged in a matrix, comprising:

a pair of substrates opposing each other;

a liquid crystal layer placed between the pair of substrates;

an alignment film formed on a surface of at least one of the pair of substrates opposing the liquid crystal layer and subjected to a treatment for aligning liquid crystal molecules in the liquid crystal layer;

a pair of polarizing plates placed so as to interpose the pair of substrates; and wherein:

the liquid crystal layer is in a horizontal orientation type ECB mode, the liquid crystal layer corresponding to each pixel is divided into at least a first liquid crystal region and a second liquid crystal region, the first liquid crystal region and the second liquid crystal region respectively have a first alignment state and a second alignment state which are different from each other, retardation of the liquid crystal layer is in a range of 340 nm to 440 nm, one of the pair of polarizing plates has an absorption axis which is substantially parallel to a 6–12 o'clock direction, while the other one of the pair of polarizing plates has an absorption axis which is substantially parallel to a 3–9 o'clock direction, and in the case where the liquid crystal display apparatus is of a normally white mode, transmittance is less than 5% regardless of a viewing angle when observed in the 6 o'clock direction, and when a black display voltage is applied the transmittance is 10% or less regardless of a viewing angle when observed in the 3 or 9 o'clock directions.

7. A liquid crystal display apparatus having a plurality of pixels arranged in a matrix, comprising:

a pair of substrates opposing each other;

a liquid crystal layer placed between the pair of substrates;

an alignment film formed on a surface of at least one of the pair of substrates opposing the liquid crystal layer and subjected to a treatment for aligning liquid crystal molecules in the liquid crystal layer;

a pair of polarizing plates placed so as to interpose the pair of substrates;

wherein the liquid crystal layer corresponding to each pixel has at least two liquid crystal regions, each of the liquid crystal regions having an alignment state different from those of the other liquid crystal regions;

wherein one of the pair of polarizing plates has an absorption axis which is substantially parallel to a 6–12 o'clock direction, while the other one of the pair of polarizing plates has an absorption axis which is substantially parallel to a 3–9 o'clock direction;

wherein the liquid crystal display apparatus is of a normally white mode; and wherein transmittance is less than 5% regardless of a viewing angle when observed in the 6 o'clock direction, and when a black display voltage is applied the transmittance is 10% or less regardless of a viewing angle when observed in the 3 or 9 o'clock directions.

* * * * *